United States Patent
Alli et al.

(10) Patent No.: US 9,244,197 B2
(45) Date of Patent: Jan. 26, 2016

(54) SILICONE HYDROGELS COMPRISING DESIRABLE WATER CONTENT AND OXYGEN PERMEABILITY

(71) Applicant: Johnson & Johnson Vision Care, Inc., Jacksonville, FL (US)

(72) Inventors: Azaam Alli, Jacksonville, FL (US); James D. Ford, Orange Park, FL (US); Scott L. Joslin, Ponte Vedra Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 14/564,667

(22) Filed: Dec. 9, 2014

(65) Prior Publication Data

US 2015/0094395 A1 Apr. 2, 2015

Related U.S. Application Data

(62) Division of application No. 13/720,277, filed on Dec. 19, 2012, now Pat. No. 8,937,111.

(60) Provisional application No. 61/579,693, filed on Dec. 23, 2011, provisional application No. 61/579,683, filed on Dec. 23, 2011.

(51) Int. Cl.
| | |
|---|---|
| *C08F 220/28* | (2006.01) |
| *C08F 220/56* | (2006.01) |
| *C08F 226/10* | (2006.01) |
| *C08F 283/10* | (2006.01) |
| *G02B 1/04* | (2006.01) |
| *C08G 77/442* | (2006.01) |

(Continued)

(52) U.S. Cl.
CPC .............. *G02B 1/043* (2013.01); *C08F 283/12* (2013.01); *C08F 283/124* (2013.01); *C08F 290/06* (2013.01); *C08F 290/068* (2013.01); *C08G 77/442* (2013.01)

(58) Field of Classification Search
None
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |

(Continued)

FOREIGN PATENT DOCUMENTS

| | | |
|---|---|---|
| WO | 0170837 A1 | 9/2001 |
| WO | 03022321 A2 | 3/2003 |

(Continued)

OTHER PUBLICATIONS

Barton, Allan F. M., Tables 13-15, CRC Handbook of Solubility Parameters and Other Cohesion Parameters, 1983, pp. 85-87, 1, CRC Press, Inc., Boca Raton, Florida.

(Continued)

*Primary Examiner* — Peter A Salamon
(74) *Attorney, Agent, or Firm* — Karen A. Harding

(57) ABSTRACT

The present invention relates to a process comprising the steps of reacting a reactive mixture comprising at least one silicone-containing component, at least one hydrophilic component, and at least one diluent to form an ophthalmic device having an advancing contact angle of less than about 80°; and contacting the ophthalmic device with an aqueous extraction solution at an elevated extraction temperature, wherein said at least one diluent has a boiling point at least about 10° higher than said extraction temperature.

54 Claims, 4 Drawing Sheets

(51) Int. Cl.
*C08F 283/12* (2006.01)
*C08F 290/06* (2006.01)

(56) References Cited

U.S. PATENT DOCUMENTS

| | | | |
|---|---|---|---|
| 4,113,224 A | 9/1978 | Clark et al. | |
| 4,136,250 A | 1/1979 | Mueller et al. | |
| 4,139,513 A | 2/1979 | Tanaka et al. | |
| 4,153,641 A | 5/1979 | Deichert et al. | |
| 4,197,266 A | 4/1980 | Clark et al. | |
| 4,246,389 A | 1/1981 | LeBoeuf | |
| 4,260,725 A * | 4/1981 | Keogh et al. | 526/279 |
| 4,495,313 A | 1/1985 | Larsen | |
| 4,810,764 A | 3/1989 | Friends et al. | |
| 4,837,289 A | 6/1989 | Mueller et al. | |
| 5,314,961 A | 5/1994 | Anton et al. | |
| 5,358,995 A * | 10/1994 | Lai et al. | 524/542 |
| 5,387,662 A | 2/1995 | Kunzler et al. | |
| 5,486,579 A | 1/1996 | Lai et al. | |
| 5,712,327 A | 1/1998 | Chang et al. | |
| 5,998,498 A * | 12/1999 | Vanderlaan et al. | 523/107 |
| 6,020,445 A | 2/2000 | Vanderlaan et al. | |
| 6,367,929 B1 | 4/2002 | Maiden et al. | |
| 6,602,930 B2 | 8/2003 | Imafuku | |
| 6,762,264 B2 | 7/2004 | Kunzler et al. | |
| 6,867,245 B2 | 3/2005 | Iwata et al. | |
| 6,902,812 B2 | 6/2005 | Valint, Jr. et al. | |
| 6,943,203 B2 | 9/2005 | Vanderlaan et al. | |
| 7,722,808 B2 * | 5/2010 | Matsuzawa et al. | 422/28 |
| 7,934,830 B2 | 5/2011 | Blackwell et al. | |
| 8,367,746 B2 * | 2/2013 | Manesis et al. | 523/106 |
| 2001/0044482 A1 | 11/2001 | Hu et al. | |
| 2002/0016383 A1 | 2/2002 | Iwata et al. | |
| 2002/0107324 A1 * | 8/2002 | Vanderlaan et al. | 525/100 |
| 2004/0039077 A1 | 2/2004 | Baba et al. | |
| 2006/0063852 A1 | 3/2006 | Iwata et al. | |
| 2006/0187410 A1 | 8/2006 | Sato et al. | |
| 2006/0229423 A1 | 10/2006 | Parakka et al. | |
| 2007/0066706 A1 * | 3/2007 | Manesis et al. | 523/106 |
| 2007/0138692 A1 | 6/2007 | Ford et al. | |
| 2008/0234457 A1 | 9/2008 | Zhou et al. | |
| 2009/0060981 A1 | 3/2009 | Chauhan | |
| 2010/0048847 A1 * | 2/2010 | Broad | 526/263 |
| 2010/0249356 A1 * | 9/2010 | Rathore et al. | 528/26 |
| 2010/0280146 A1 | 11/2010 | Vanderlaan et al. | |
| 2011/0046332 A1 | 2/2011 | Breiner et al. | |
| 2011/0230589 A1 * | 9/2011 | Maggio et al. | 523/107 |
| 2011/0237766 A1 | 9/2011 | Maggio et al. | |
| 2011/0275734 A1 | 11/2011 | Scales et al. | |
| 2012/0214899 A1 | 8/2012 | Lee et al. | |
| 2012/0216488 A1 | 8/2012 | Liu et al. | |
| 2012/0216489 A1 | 8/2012 | Lee et al. | |
| 2012/0218509 A1 | 8/2012 | Back et al. | |
| 2012/0219387 A1 | 8/2012 | Atkinson et al. | |
| 2012/0220688 A1 | 8/2012 | Wang et al. | |
| 2012/0220689 A1 | 8/2012 | Yao et al. | |
| 2012/0220743 A1 | 8/2012 | Francis et al. | |
| 2012/0220744 A1 | 8/2012 | Liu et al. | |
| 2013/0217620 A1 | 8/2013 | Alli et al. | |
| 2014/0031447 A1 | 1/2014 | Alli et al. | |

FOREIGN PATENT DOCUMENTS

| | | |
|---|---|---|
| WO | 03022322 A2 | 3/2003 |
| WO | 2004081105 A2 | 9/2004 |
| WO | 2008054667 A1 | 5/2008 |
| WO | 2008116131 A2 | 9/2008 |
| WO | 2009058207 A1 | 5/2009 |
| WO | 2010078150 A1 | 7/2010 |
| WO | 2010147864 A2 | 12/2010 |
| WO | 2011041523 A2 | 4/2011 |
| WO | 2012118677 A1 | 9/2012 |
| WO | 2012118680 A1 | 9/2012 |
| WO | 2012118683 A1 | 9/2012 |

OTHER PUBLICATIONS

Crivello, et al, Photoinitiators for Free Radical Cationic & Anionic Photopolymerisation, 2nd Edition, vol. III, pp. 275-298, John Wiley and Sons, New York, 1998.

International Preliminary Report on Patentability, dated Jun. 24, 2014 for PCT Int'l Appln. No. PCT/US2012/070879.

Lai, et al, The Role of Ionic Hydrophilic Monomers in Silicone Hydrogels for Contact Lens Application, PMSE Proceedings, ACS National Meeting, Apr. 13-17, 1997, pp. 34, vol. 76, San Francisco, CA.

Moad et al, The Chemistry of Radical Polymerization, 2nd Edition, 2006, pp. 472-479, 488-489, 508-514.

PCT International Preliminary Report on Patentability, dated Jun. 24, 2014, for PCT Int'l Appln. No. PCT/US2012/070890.

PCT International Preliminary Report on Patentability, dated Jun. 24, 2014, for PCT Int'l Appln. No. PCT/US2012/070895.

PCT International Preliminary Report on Patentability, dated Jun. 24, 2014, for PCT Int'l Appln. No. PCT/US2012/070899.

PCT International Preliminary Report on Patentability, dated Jun. 24, 2014, for PCT Int'l Appln. No. PCT/US2012/070906.

PCT International Search Report, dated Mar. 18, 2013, for PCT Int'l Appln. No. PCT/US2012/070879.

PCT International Search Report, dated Apr. 18, 2013, for PCT Int'l Appln. No. PCT/US2012/070890.

PCT International Search Report, dated Mar. 19, 2013, for PCT Int'l Appln. No. PCT/US2012/070895.

PCT International Search Report, dated Mar. 22, 2013, for PCT Int'l Appln. No. PCT/US2012/070906.

PCT International Search Report, dated May 13, 2013, for PCT Int'l Appln. No. PCT/US2012/070899.

* cited by examiner

US 9,244,197 B2

SILICONE HYDROGELS COMPRISING DESIRABLE WATER CONTENT AND OXYGEN PERMEABILITY

RELATED APPLICATIONS

This application is a division of U.S. patent application Ser. No. 13/720,277 filed Dec. 19, 2012, now U.S. Pat. No. 8,937,111; which claims priority to U.S. Provisional Patent Application No. 61/579693, filed on Dec. 23, 2011 entitled SILICONE HYDROGELS COMPRISING N-VINYL AMIDES AND HYDROXYALKYL (METH)ACRYLATES OR (METH)ACRYLAMIDES, and U.S. Provisional Patent Application No. 61/579683, filed on Dec. 23, 2011 entitled SILICONE HYDROGELS HAVING A STRUCTURE FORMED VIA CONTROLLED REACTION KINETICS, the contents of which are incorporated by reference.

FIELD OF THE INVENTION

The present invention relates to silicone hydrogels displaying desirable water content and oxygen permeability.

BACKGROUND OF THE INVENTION

Soft contact lenses made from silicone hydrogels contact lenses offer improved oxygen permeability as compared to soft lenses made from non-silicone materials such as poly(2-hydroxyethyl methacrylate) (HEMA). Initial efforts to make silicone hydrogel contact lenses were hampered by the poor wettability, high modulus, poor clarity, hydrolytic instability or the high cost of raw materials used to make many of these silicone hydrogels. While various solutions have proven somewhat successful for each of these deficiencies, there remains a need for silicone hydrogels that can be made from inexpensive commercially available monomers, and which have excellent wettability (without the need for surface modification), low modulus, good clarity, and hydrolytic stability.

Silicone hydrogels formulations containing polymeric wetting agents, such as poly(N-vinylpyrrolidone) (PVP) and acyclic polyamides have been disclosed. However, these polymers are quite large and require the use of special compatibilizing components, which need to be custom manufactured. Examples of compatibilizing components include 2-propenoic acid, 2-methyl-,2-hydroxy-3-[3-[1,3,3,3-tetramethyl-1-[(trimethylsilyl)oxy]disiloxanyl]propoxy]propyl ester (SiGMA).

An alternative means of forming a wettable silicone hydrogel lens is to incorporate monomeric N-vinylpyrrolidone (NVP) into the monomer mix used to make the silicone hydrogel polymer, typically in amounts of about 25-55% (by weight) of the monomer mix. Such materials have been described in U.S. Pat. Nos. 4,136,250; 4,153,641; 4,260,725 and 6,867,245. The materials described in these references generally incorporate polyfunctional silicone monomers or macromers, that act as crosslinking agents, and thereby increase the modulus of the final polymer. U.S. Pat. No. 4,139,513 discloses that 2-propenoic acid, 2-methyl-,2-hydroxy-3-[3-[1,3,3,3-tetramethyl-1-[(trimethylsilyl)oxy]disiloxanyl]propoxy]propyl ester (SiGMA) can be used to form lenses from formulations comprising NVP and HEMA. SiGMA is the only source of silicone disclosed. However, because of the relatively low silicone content in those monomers, desirable levels of oxygen permeability in the final polymers are difficult to achieve. There is no disclosure which would suggest how to incorporate silicones which do not comprise compatibilizing functionality into the formulation.

US 2010/0048847 discloses silicone hydrogels made from a blend of a monomethacryloxyalkyl polydimethylsiloxane methacrylate with about 52% NVP, HEMA and TRIS, and using a blend of ethanol and ethyl acetate as a diluent. The polymers disclosed are (to varying degrees) hazy, but it was disclosed in this application that the haziness could be reduced by the addition of at least about 1.5% methacrylic acid (MAA).

Addition of anionic monomers such as MAA can, however, cause hydrolytic instability in silicone hydrogels, as was disclosed in "The role of ionic hydrophilic monomers in silicone hydrogels for contact lens application", Lai, Y., Valint, P., and Friends, G.; 213th ACS National Meeting, San Francisco, Apr. 13-17, 1997. For this reason, it remains desirable to form clear, hydrolytically stable, wettable (without surface treatment) silicone hydrogels with low moduli from a combination of a monomethacryloxyalkyl polydimethylsiloxane methacrylate such as mPDMS, and NVP.

SUMMARY OF THE INVENTION

The present invention relates to silicone hydrogels comprising a water content of at least about 50% and an oxygen permeability of at least about 80 barrers wherein said silicone hydrogel is formed from a reaction mixture comprising about 37 to about 75 wt % of at least one slow-reacting hydrophilic monomer having a slow-reacting hydrophilic monomer kinetic half life;

at least one silicone-containing component having a silicone-containing component kinetic half life, which may be optionally substituted with at least one hydroxyl containing group;

at least one hydroxyl-containing component selected from at least one hydroxyl-substituted, silicone-containing component, at least one hydroxyalkyl monomer, and mixtures thereof, wherein ratio of said slow-reacting hydrophilic component half life to said silicone-containing component half life is at least 2, said silicone containing components comprise between 9 and 14% silicon and less than 15 wt % TRIS and all reactive components other than said slow-reacting hydrophilic monomer and said silicone containing components in the reaction mixture are present in an amount between about 11 and about 92 mmol/100 g reactive components.

The silicone hydrogels of the present invention are useful for making biomedical devices, ophthalmic devices, and particularly contact lenses.

DETAILED DESCRIPTION OF THE INVENTION

Figure 1:
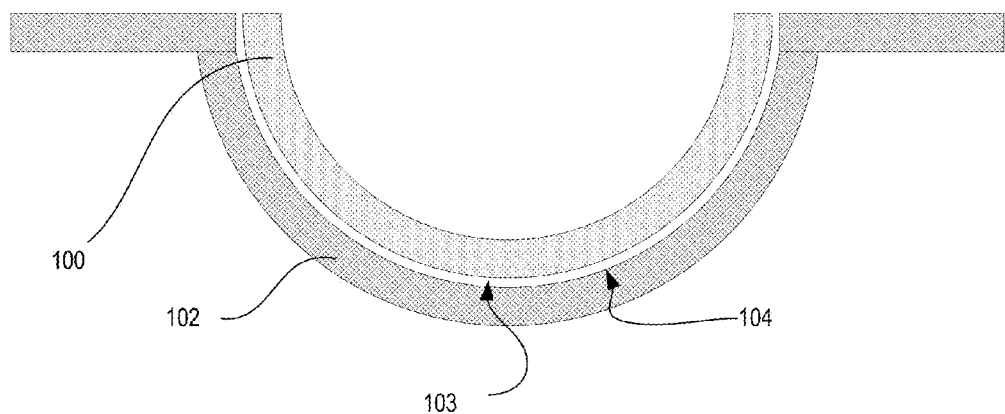
FIG. 1 is a schematic of a lens assembly.

The present invention relates to compositions comprising from about 40 to about 60 wt % of at least one slow reacting hydrophilic monomer, at least one at least one mono(meth)acryloxyalkyl polydialkylsiloxane monomer; one hydroxyalkyl (meth)acrylate or (meth)acrylamide monomer, and at least one crosslinking monomer; wherein said at least one hydroxyalkyl (meth)acrylate or (meth)acrylamide monomer and said slow reacting hydrophilic monomer are present in mole percents which form a molar ratio between about 0.15 and 0.4.

It has been surprisingly found that the formulations of the present invention form hydrogels with a desirable balance of properties. The formulations may be made using a range of diluents, no diluent and in some embodiments may also be cured using light.

As used herein, "diluent" refers to a diluent for the reactive composition. Diluents do not react to form part of the biomedical devices.

As used herein, "compatibilizing agent" means a compound, which is capable of solubilizing the selected reactive components. Compatibilizing agents have a number average molecular weight of about less than 5000 Daltons, and in another less than about 3000 Daltons. The compatibilizing agent of the present invention solubilizes via hydrogen bonding, dispersive forces, combinations thereof and the like. Thus, any functionality which interacts in any of these ways with the high molecular weight hydrophilic polymer may be used as a compatibilizing agent. Compatibilizing agents in the present invention may be used in an amount so long as they do not degrade other desirable properties of the resulting ophthalmic device. The amount will depend in part on the amount of high molecular weight hydrophilic polymer used. One class of compatibilizing agents comprises at least one silicone and at least one hydroxyl group. Such components are referred to as "silicone containing compatibilizing component" and have been disclosed in WO03/022321 and WO03/022322.

As used herein, a "biomedical device" is any article that is designed to be used while either in or on mammalian tissues or fluid, and in one embodiment in or on human tissue or fluids. Examples of these devices include but are not limited to catheters, implants, stents, and ophthalmic devices such as intraocular lenses, punctal plugs and contact lenses. In one embodiment the biomedical devices are ophthalmic devices, particularly contact lenses, most particularly contact lenses made from silicone hydrogels.

As used herein, the terms "ophthalmic product" "lens" and "ophthalmic device" refer to devices that reside in or on the eye. These devices can provide optical correction, wound care, drug delivery, diagnostic functionality, cosmetic enhancement or effect, glare reduction, UV blocking or a combination of these properties. Non-limiting examples of ophthalmic devices include lenses, punctal plugs and the like. The term lens (or contact lens) includes but is not limited to soft contact lenses, hard contact lenses, intraocular lenses, overlay lenses, ocular inserts, and optical inserts.

As used herein "reaction mixture" refers to reactive and non-reactive components (including the diluent) that are mixed together and reacted to form the silicone hydrogels of the present invention. The reactive components are everything in the reaction mixture except the diluent and any additional processing aids which do not become part of the structure of the polymer.

As used herein "(meth)" refers to an optional methyl substitution. Thus, a term such as "(meth)acrylate" denotes both methacrylic and acrylic radicals.

All percentages in this specification are weight percentages unless otherwise noted.

As used herein, the phrase "without a surface treatment" or "not surface treated" means that the exterior surfaces of the devices of the present invention are not separately treated to improve the wettability of the device. Treatments which may be foregone because of the present invention include, plasma treatments, grafting, coating and the like. However, coatings which provide properties other than improved wettability, such as, but not limited to antimicrobial coatings and the application of color or other cosmetic enhancement, may be applied to devices of the present invention.

As used herein "silicone macromers" and silicone "prepolymers" mean mono- and multi-functional silicone containing compounds having molecular weights of greater than about 2000.

As used herein "hydroxyl-containing component" is any component containing at least one hydroxyl group.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl $C_{1-6}$alkyls, O-vinylcarbamates and O-vinylcarbonates. Non-limiting examples of cationic reactive groups include vinyl ethers or epoxide groups and mixtures thereof. Non-limiting examples of the free radical reactive groups include (meth)acrylate, acryloxy, (meth)acrylamide, and mixtures thereof.

In the present invention the components are selected to react at specific points in the reaction. For example, "fast reacting" components are selected to polymerize primarily at the beginning of the reaction, while the slow reacting hydrophilic monomer is selected to polymerize primarily at the end of the reaction. Fast reacting components include the silicone-containing components, the hydroxyalkyl monomers and some crosslinkers.

In one embodiment, slow reacting components have kinetic half lives which are at least about two times greater than the fastest silicone containing monomer. Kinetic half lives may be measured as described herein. It should be appreciated that the kinetic half lives are relative to specific formulations.

Examples of slow reacting groups include (meth)acrylamides, vinyls, allyls and combinations thereof and a least one hydrophilic group. In another embodiment the slow reacting group is selected from N-vinyl amides, O-vinyl carbamates, O-vinyl carbonates, N-vinyl carbamates, O-vinyl ethers, O-2-propenyl, wherein the vinyl or allyl groups may be further substituted with a methyl group. In yet another embodiment the slow reacting group is selected from N-vinyl amides, O-vinyl carbonates, and O-vinyl carbamates.

Examples of fast reacting groups include (meth)acrylates, styryls, methacryamides and mixtures thereof. Generally (meth)acrylates are faster than (meth)acrylamides, and acrylamides are faster than (meth)acrylamides Throughout the specification, wherever chemical structures are given, it should be appreciated that alternatives disclosed for the substituents on the structure may be combined in any combination. Thus if a structure contained substituents $R_1$ and $R_2$, each of which contained three lists of potential groups, 9 combinations are disclosed. The same applies for combinations of properties.

The present invention relates silicone hydrogels which display a balance of desirable properties, particularly a bulk water content of at least about 50%, at least about 55% and at least about 60%, with oxygen permeabilities of at least about 85 barrers, about least about 90 barrers, at least about 100 barrers, from about 85 to about 150 barrers, and from about 85 to 130 barrers. It is a surprising benefit of the present invention that both the water contents and the oxygen permeabilities can be achieved in the same lens.

The silicone hydrogels of the present invention may be formed from a combination of three components, at least one slow-reacting hydrophilic monomer, at least one silicone-containing monomer and at least one hydroxyalkyl monomer. Applicants have found that by controlling the amount of the components other than the slow-reacting monomer and silicone containing components to about 11 to about 92 mmol/100 g of reactive components, silicone hydrogels having combination of water content and oxygen permeability described herein may be produced. The silicone hydrogels of the present invention are in one embodiment particularly well suited for contact lenses as they transmit levels of oxygen desirable for healthy corneal function and have water contents which approach those of the ocular environment.

The first component of the reactive mixture is a slow reacting component selected from N-vinylamide monomers of Formula I, vinyl pyrrolidones of Formula II-IV, n-vinyl piperidone of Formula V:

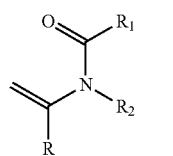
Formula I

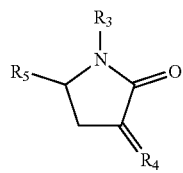
Formula II

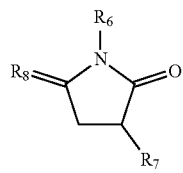
Formula III

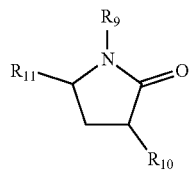
Formula IV

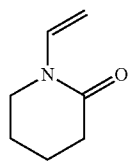
Formula V wherein R is H or methyl, and in one embodiment R is H;

$R_1$, $R_2$, $R_3$, $R_6$, $R_7$, $R_{10}$, and $R_{11}$ are independently selected from H, $CH_3$, $CH_2CH_3$, $CH_2CH_2CH_3$, $C(CH_3)_2$;

$R_4$ and $R_8$ are independently selected from $CH_2$, $CHCH_3$ and $—C(CH_3)$;

$R_5$ is selected from H, methyl, ethyl; and $R_9$ is selected from $CH=CH_2$, $CCH_3=CH_2$, and $CH=CHCH_3$.

The total number of carbon atoms in $R_1$ and $R_2$ may be 4 or less, and in another embodiment $R_1$ and $R_2$ are methyl.

The slow-reacting hydrophilic monomer may be selected from the N-vinyl amide monomer of Formula I or a vinyl pyrrolidone of Formula II or IV. In yet another embodiment $R_6$ is methyl, $R_7$ is hydrogen, $R_9$ is $CH=CH_2$, $R_{10}$ and $R_{11}$ are H.

In another embodiment the slow-reacting hydrophilic monomer is selected from ethylene glycol vinyl ether (EGVE), di(ethylene glycol) vinyl ether (DEGVE), N-vinyl lactams, including N-vinyl pyrrolidone (NVP), 1-methyl-3-methylene-2-pyrrolidone, 1-methyl-5-methylene-2-pyrrolidone, 5-methyl-3-methylene-2-pyrrolidone; 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, N-vinyl-N-methyl acetamide (VMA), N-vinyl-N-ethyl acetamide, N-vinyl-N-ethyl formamide, N-vinyl formamide, N-vinyl acetamide, N-vinyl isopropylamide, allyl alcohol, N-vinyl caprolactam, N-2-hydroxyethyl vinyl carbamate, N-carboxyvinyl-β-alanine (VINAL), N-carboxyvinyl-α-alanine and mixtures thereof.

In another embodiment the slow-reacting hydrophilic monomer is selected from NVP, VMA and 1-methyl-5-methylene-2-pyrrolidone. In yet another embodiment the slow-reacting hydrophilic monomer comprises NVP.

The slow reacting hydrophilic monomer is present in amounts to provide wettability to the resulting polymer. Wettability may be measured via advancing contact angle, and desirable contact angles are less than about 80°, less than about 70° and in some embodiments less than about 60°. The slow reacting hydrophilic monomer may be present in amounts between about 30 and about 75 wt %, between about 37 and about 75 wt %, between about 30 and about 70 wt %, between about 37 and about 70 wt %, and between about 39 and about 60 wt %, all based upon all reactive components.

The at least one silicone-containing monomer is monofunctional and comprises (a) a fast reacting group and (b) a polydialkyl siloxane chain. In another embodiment the silicon-containing monomer comprises a fast reacting group selected from (meth)acrylates, styryls, (meth)acrylamides and mixtures thereof. The at least one silicone-containing monomer may also contain at least one fluorine. In yet another embodiment the silicone-containing component is selected from mono (meth)acryloxyalkyl polydialkylsiloxane and mono (meth)acrylamide alkyl polydialkylsiloxane monomer of Formula VII or the styryl polydialkylsiloxane monomer of Formula VIII:

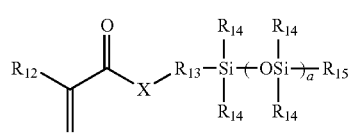
Formula VII

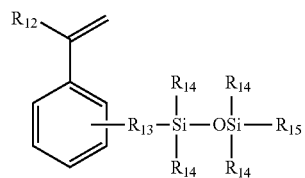
Formula VIII wherein $R_{12}$ is H or methyl;

X is O or $NR_{16}$;

Each $R_{14}$ is independently a phenyl or $C_1$ to $C_4$ alkyl which may be substituted with fluorine, hydroxyl or ether, and in another embodiment each $R_{14}$ is independently selected from ethyl and methyl groups, and in yet another embodiment, all $R_{14}$ are methyl;

$R_{15}$ is a $C_1$ to $C_4$ alkyl;

$R_{13}$ is a divalent alkyl group, which may further be functionalized with a group selected from the group consisting of ether groups, hydroxyl groups, carbamate groups and combinations thereof, and in another embodiment $C_1$-$C_6$ alkylene groups which may be substituted with ether, hydroxyl and combinations thereof, and in yet another embodiment $C_1$ or $C_3$-$C_6$ alkylene groups which may be substituted with ether, hydroxyl and combinations thereof;

a is 2 to 50, and in some embodiments 5 to 15.

$R_{16}$ is selected from H, $C_{1-4}$alkyl, which may be further substituted with one or more hydroxyl groups, and in some embodiments is H or methyl.

In yet another embodiment $R_{12}$ and each $R_{14}$ are methyl.

In yet another embodiment at least one $R_{14}$ is 3,3,3-trifluoropropyl.

Examples of suitable silicone-containing monomers include monomethacryloxyalkylpolydimethylsiloxane methacrylates selected from the group consisting of monomethacryloxypropyl terminated mono-n-butyl terminated polydimethylsiloxane, monomethacryloxypropyl terminated mono-n-methyl terminated polydimethylsiloxane, monomethacryloxypropyl terminated mono-n-butyl terminated polydiethylsiloxane, monomethacryloxypropyl terminated mono-n-methyl terminated polydiethylsiloxane, N-(2,3-dihydroxypropane)-N'-(propyl tetra(dimethylsiloxy) dimethylbutylsilane)acrylamide, α-(2-hydroxy-1-methacryloxypropyloxypropyl)-ω-butyl-decamethylpentasiloxane, and mixtures thereof.

In another embodiment the silicone-containing component is selected from the group consisting of monomethacryloxypropyl terminated mono-n-butyl terminated polydimethylsiloxane, monomethacryloxypropyl terminated mono-n-methyl terminated polydimethylsiloxane, N-(2,3-dihydroxypropane)-N'-(propyl tetra(dimethylsiloxy) dimethylbutylsilane)acrylamide, α-(2-hydroxy-1-methacryloxypropyloxypropyl)-ω-butyl-decamethylpentasiloxane, and mixtures thereof.

In another embodiment the silicone containing component is selected from acrylamide silicones of U.S. Ser. No. 13/048,469, US20110237766, and particularly the silicone monomers expressed in the following general formulae (s1) through (s6).

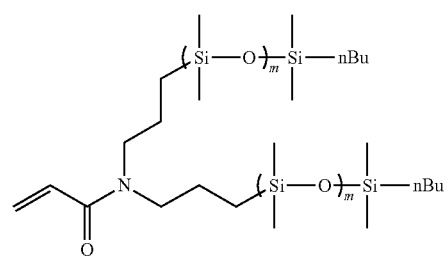

s1

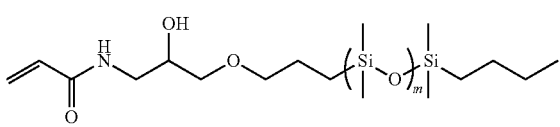

s2

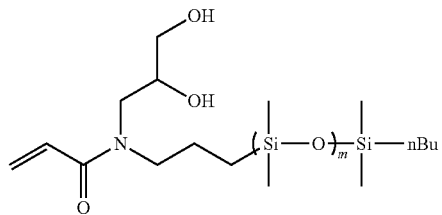

s3

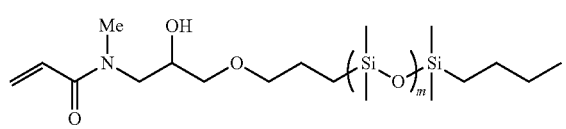

s4

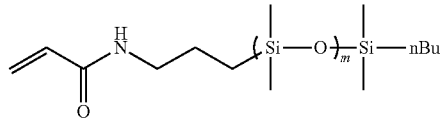

s5

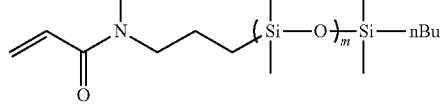

s6 wherein m is 4-12 and in some embodiments 4-10.

Additional silicone containing components containing one or more polymerizable groups may also be included. Any additional disclosed silicone components having the herein disclosed reactive groups may be included. Examples include silicone containing monomers displaying branched siloxane chains such as SiMAA.

The at least one silicone-containing component is present in the reactive mixture in an amount sufficient to provide the desired oxygen permeability. It is a benefit of the present invention that oxygen permeabilities greater than about 70 barrer, greater than about 80 barrer, in some embodiments greater than about 90 barrer, and in other embodiments greater than about 100 barrer may be achieved. Suitable amounts will depend on the length of the siloxane chain included in the silicone-containing monomers, with silicone-containing monomers having longer chains requiring less monomer. Amounts include from about 20 to about 60 weight %, and in some embodiments from about 30 to about 55 weight %.

In one embodiment the total amount of silicon in the reactive mixture (excluding diluent) is between about 9 and 14 wt % and between about 9 and 13%. Limiting the amount of silicon, in combination balancing the amount of the slow-reacting hydrophilic monomer and the other reactive components, provides the desirable combination of properties achieved by the present invention. It is a benefit of the present application that silicone hydrogels having the combination oxygen permeabilities and water contents may be formed with only moderate amounts (less than 14 wt %) silicon.

In one embodiment the reaction mixture comprises less than about 10 wt % TRIS, less than 5 wt % TRIS and in some embodiments is substantially free of TRIS. In some embodiments, the silicone hydrogels may also be made without silicone containing macromers or prepolymers.

The reactive mixtures of the present invention further comprise at least one hydroxyalkyl monomer selected from hydroxyalkyl (meth)acrylate or (meth)acrylamide monomer of Formula IX or a styryl compound of Formula X

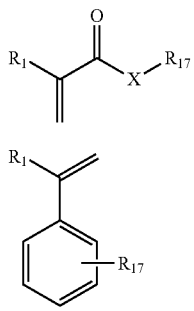

FORMULA IX

FORMULA X wherein $R_1$ is H or methyl,

X is O or $NR_{16}$, $R_{16}$ is a H, $C_1$ to $C_4$ alkyl, which may be further substituted with at least one OH, in some embodiments methyl or 2-hydroxyethyl; and $R_{17}$ is selected from $C_2$-$C_4$ mono or dihydroxy substituted alkyl, and poly(ethylene glycol) having 1-10 repeating units; and in some embodiments 2-hydroxyethyl, 2,3-dihydroxypropyl, 2-hydroxypropyl.

In one embodiment $R_1$ is H or methyl, X is oxygen and R is selected from $C_2$-$C_4$ mono or dihydroxy substituted alkyl, and poly(ethylene glycol) having 1-10 repeating units. In another embodiment $R_1$ methyl, X is oxygen and R is selected from $C_2$-$C_4$ mono or dihydroxy substituted alkyl, and poly (ethylene glycol) having 2-20 repeating units, and in yet another embodiment $R_1$ methyl, X is oxygen and R is selected from $C_2$-$C_4$ mono or dihydroxy substituted alkyl. In one embodiment, at least one hydroxyl group is on the terminal end of the R alkyl group.

Examples of suitable hydroxyalkyl monomer include 2-hydroxyethyl methacrylate, 2-hydroxyethyl acrylate, 3-hydroxypropyl (meth)acrylate, 2-hydroxypropyl (meth)acrylate, 1-hydroxypropyl-2-(meth)acrylate, 2-hydroxy-2-methyl-propyl (meth)acrylate, 3-hydroxy-2,2-dimethyl-propyl (meth)acrylate, 4-hydroxybutyl (meth)acrylate, glycerol (meth)acrylate, 2-hydroxyethyl (meth)acrylamide, polyethyleneglycol monomethacrylate, bis-(2-hydroxyethyl) (meth) acrylamide, 2,3-dihydroxypropyl (meth)acrylamide, and mixtures thereof.

In another embodiment the hydroxyalkyl monomer is selected from the group consisting of 2-hydroxyethyl methacrylate, glycerol methacrylate, 2-hydroxypropyl methacrylate, hydroxybutyl methacrylate, 3-hydroxy-2,2-dimethyl-propyl methacrylate, and mixtures thereof.

In yet another embodiment the hydroxyalkyl monomer comprises 2-hydroxyethyl methacrylate, and in another embodiment comprises 3-hydroxy-2,2-dimethyl-propyl methacrylate. In an alternate embodiment the reactive hydroxyalkyl monomer comprises glycerol methacrylate.

In one embodiment, the hydroxyl containing components have the same reactive functionality as the silicone-containing monomers.

In one embodiment the hydroxyalkyl monomers are present in mole percents which form a molar ratio of hydroxyl groups to slow reacting hydrophilic monomer of at least about 0.15 and in some embodiments between about 0.15 and about 0.4. This is calculated by dividing the number of moles of hydroxyl groups in the hydroxyalkyl monomers (including any hydroxyl groups on the slow-reacting hydrophilic monomer and the silicone-containing monomer) by the number of moles of the slow-reacting hydrophilic monomer per a given mass of the monomer mix. In this embodiment, for a reaction mixture comprising HO-mPDMS, HEMA, EGVE and NVP, the hydroxyl groups on each of HO-mPDMS, HEMA and EGVE would be counted. Any hydroxyl groups present in the diluent (if used) are not included in the calculation. In one embodiment, the lower amount of hydroxyalkyl monomers is selected to provide a haze value to the final lens of less than about 50% and in some embodiments less than about 30%.

Alternatively, the molar ratio of hydroxyl groups in the reaction mixture to silicon (HO:Si) is between about 0.16 and about 0.4. The molar ratio is calculated by dividing molar concentration of hydroxyl groups in the components of the reactive mixture (other than any hydroxyls which are part of the slow-reacting hydrophilic monomer or diluents) by the molar concentration of silicon. In this embodiment both the hydroxyalkyl monomers and any hydroxyl-containing silicone components are included in the calculation. Thus, in calculating the HO:Si ratio of the reaction mixture comprising HO-mPDMS, HEMA, EGVE and NVP, only the hydroxyl groups on each of HO-mPDMS, HEMA would be counted in calculating the HO:Si.

In another embodiment the molar ratio of hydroxyl groups in non-silicone containing components (other than any hydroxyls which are part of the slow-reacting hydrophilic monomer or diluents) to silicon is between about 0.13 and about 0.35, about 0.13 and about 0.3, and about 0.13 and about 0.25. Thus, in calculating the $HO_{non-Si}$:Si ratio of the reaction mixture comprising HO-mPDMS, HEMA, EGVE, and NVP only the hydroxyl groups on, HEMA would be counted in calculating the $HO_{non-Si}$:Si ratio.

It will be appreciated that the minimum amount of hydroxyl component will vary depending upon a number of factors, including, the number of hydroxyl groups on the hydroxyalkyl monomer, the amount, molecular weight and presence or absence of hydrophilic functionality on the silicone containing components. For example, where HEMA is used as the hydroxyalkyl monomer and mPDMS is used in amounts about 38 wt % as the sole silicone containing monomer, at least about 8 wt % HEMA (0.16 HO:Si) is included to provide the desired haze values. However, when lesser amounts of mPDMS are used (about 20%), as little as about 2 or 3% HEMA provides silicone hydrogel contact lenses having haze values below about 50%.

The reactive mixture may further comprise additional hydrophilic monomers. Any hydrophilic momomers used to prepare hydrogels may be used. For example monomers containing acrylic groups ($CH_2$=CROX, where R is hydrogen or $C_{1-6}$alkyl an X is O or N) or vinyl groups (—C=$CH_2$) may be used. Examples of additional hydrophilic monomers are N,N-dimethylacrylamide, polyethyleneglycol monomethacrylate, methacrylic acid, acrylic acid, combinations thereof and the like. If the additional hydrophilic monomers are not slow reacting monomers as defined herein, their concentrations in the formulations of the present invention may be limited to concentrations which do not provide the lens with a contact angle higher than about 80°. As used herein, "intermediate" half life is one that is between 20% and 70% faster than the slowest reacting silicone component. For example, if the additional hydrophilic monomer has a kinetic half life which is between the half lives of the vinyl containing monomer and the silicone components, (such as N,N-dimethylacrylamide), the amount of the additional hydrophilic monomer is limited to below about 3 wt %. In embodiments where the lens is to be surface modified, higher amounts of additional monomers may be included.

The total amount of reactive components other than silicone-containing components and slow-reacting hydrophilic components ("ancillary components") is between about 11 and about 92 mmol ancillary components/100 gm reactive mixture and between about 38 and about 76 mmol ancillary components/100 gm reactive mixture. In another embodiment the amount of fast or intermediate curing ancillary reactive components is between about 11 and about 92 mmol ancillary components/100 gm reactive mixture and between about 38 and about 76 mmol ancillary components/100 g reactive mixture.

Ancillary components include non-silicone containing hydroxyalkyl monomer, additional hydrophilic monomers which are not slow reacting as defined herein, and additional components including, crosslinkers, reactive tints, dyes and pigments, and combinations thereof.

The reaction mixtures of the present invention further comprise at least one crosslinker. A crosslinker is a monomer with two or more polymerizable double bonds. Suitable crosslinkers include ethylene glycol dimethacrylate ("EGDMA"), trimethylolpropane trimethacrylate ("TMPTMA"), glycerol trimethacrylate, polyethylene glycol dimethacrylate (wherein the polyethylene glycol preferably has a molecular weight up to, e.g., about 5000), and other polyacrylate and polymethacrylate esters, such as the end-capped polyoxyethylene polyols described above containing two or more terminal methacrylate moieties. The crosslinker may be used in the usual amounts, e.g., from about 0.000415 to about 0.0156 mole per 100 grams of reactive components in the reaction mixture. Alternatively, if the hydrophilic monomers and/or the silicone containing monomers act as the crosslinking agent, the addition of an additional crosslinking agent to the reaction mixture is optional. Examples of hydrophilic monomers which can act as the crosslinking agent and when present do not require the addition of an additional crosslinking agent to the reaction mixture include polyoxyethylene polyols described above containing two or more terminal methacrylate moieties.

An example of a silicone containing monomer which can act as a crosslinking agent and, when present, does not require the addition of a crosslinking monomer to the reaction mixture includes α,ω-bismethacryloypropyl polydimethylsiloxane.

The reaction mixtures can also contain multiple crosslinkers depending on the reaction rate of the hydrophilic component. With very slow reacting hydrophilic components (e.g. VMA, EGVE, DEGVE) crosslinkers having slow reacting functional groups (e.g. di-vinyl, tri-vinyl, di-allyl, tri-allyl) or a combination of slow reacting functional groups and fast reacting functional groups (e.g. HEMAVc) can be combined with crosslinkers having fast reacting functional groups ((meth)acrylates) to improve the retention of the polymers of the slow-reacting monomers in the final hydrogel.

In one embodiment the reaction mixture comprises at least two crosslinkers, at least one first crosslinker having at least two fast reacting groups which will react with the silicone components and hydroxyl alkyl (meth)acrylates and at least one second crosslinker having at least two slow reacting groups which react with the slow reacting hydrophilic monomer. This mixture of fast and slow reacting crosslinkers provides the final polymer with improved resilience and recovery, particularly on the surface of the lens. Examples of suitable first crosslinkers include those having only (meth)acrylate functionality, such as EGDMA, TEGDMA and combinations thereof. Examples of suitable second crosslinkers include those having only vinyl functionality, such as triallyl cyanurate (TAC). When mixtures are used, suitable total amounts of all crosslinker in the reactive mixture include between about 0.10% and about 2%, and about 0.1 to about 1% wt, excluding diluent respectively. In another embodiment the total amount of all crosslinker in the reactive mixtures is between 0.7 to about 6.0 mmol/100 g of polymerizable components; between about 0.7 to about 4.0 mmoles per 100 g of reactive components. The fast and slow reacting crosslinkers are present in respective amounts of about 0.3 to about 2.0 mmol/100 g of polymerizable components and between about 0.4 to about 2.0 mmoles per 100 g of reactive components.

The reaction mixture may also comprise at least one UV absorbing compound. When the silicone hydrogel will be used as an ophthalmic device it may be desirable to incorporate a reactive UV absorbing compound in the reaction mixture so that the resulting silicone hydrogel will be UV absorbing. Suitable UV absorbers may be derived from 2-(2'-hydroxyphenyl)benzotriazoles, 2-hydroxybenzophenones, 2-hydroxyphenyltriazines, oxanilides, cyanoacrylates, salicylates and 4-hydroxybenzoates; which may be further reacted to incorporate reactive polymerizable groups, such as (meth)acrylates. Specific examples of UV absorbers which include polymerizable groups include 2-(2'-hydroxy-5-methacrylyloxyethylphenyl)-2H-benzotriazole (Norbloc), 5-vinyl and 5-isopropenyl derivatives of 2-(2,4-dihydroxyphenyl)-2H-benzotriazole and 4-acrylates or 4-methacrylates of 2-(2,4-dihydroxyphenyl)-2H-benzotriazole or 2-(2,4-dihydroxyphenyl)-1,3-2H-dibenzotriazole, mixtures thereof and the like. When a UV absorber is included, it may be included in amounts between about 0.5 and about 4 wt %, and in other embodiments between about 1 wt % and about 2 wt %.

A polymerization initiator is preferably included in the reaction mixture. The reaction mixtures of the present invention comprise at least one thermal, photoinitiator or a mixture thereof. The use of photoinitiation provides desirable cure times (time to reach essentially complete cure) of less than about 30 minutes, less than about 20 minutes and in some embodiments less than about 15 minutes. Suitable photoinitiator systems include aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitiators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998, which is incorporated herein by reference. Suitable thermal initiators include lauryl peroxide, benzoyl peroxide, isopropyl percarbonate, azobisisobutyronitrile, and the like. The initiator is used in the reaction mixture in effective amounts to initiate polymerization of the reaction mixture, e.g., from about 0.1 to about 2 parts by weight per 100 parts of reactive monomer.

The reaction mixture may also comprise at least one diluent or may be "neat". If a diluent is used, the selected diluents should solubilize the components in the reactive mixture. It will be appreciated that the properties of the selected hydrophilic and hydrophobic components may affect the properties of the diluents which will provide the desired compatibilization. For example, if the reaction mixture contains only moderately polar components, diluents having moderate δp may be used. If however, the reaction mixture contains strongly polar components, the diluent may need to have a high δp. However, as the diluent becomes more hydrophobic, processing steps necessary to replace the diluent with water will require the use of solvents other than water. This may undesirably increase the complexity and cost of the manufacturing process. Thus, it is important to select a diluent which provides the desired compatibility to the components with the necessary level of processing convenience.

The type and amount of diluent used also effects the properties of the resultant polymer and article. The haze, wettability and modulus of the final article may be improved by selecting relatively hydrophobic diluents and/or decreasing the concentration of diluent used.

Diluents useful in preparing the devices of this invention include polar diluents such as ethers, esters, amides, alcohols, carboxylic acids and combinations thereof. Amides, carboxylic acids and alcohols are preferred diluents, and secondary and tertiary alcohols are more preferred alcohol diluents.

Examples of alcohols useful as diluents for this invention include those having the formula

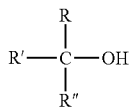

wherein R, R' and R" are independently selected from H, a linear, branched or cyclic monovalent alkyl having 1 to 10 carbons which may optionally be substituted with one or more groups including halogens, ethers, esters, aryls, amines, amides, alkenes, alkynes, carboxylic acids, alcohols, aldehydes, ketones or the like, or any two or all three of R, R' and R" can together bond to form one or more cyclic structures, such as alkyl having 1 to 10 carbons which may also be substituted as just described, with the proviso that no more than one of R, R' or R" is H.

It is preferred that R, R' and R" are independently selected from H or unsubstituted linear, branched or cyclic alkyl groups having 1 to 7 carbons. It is more preferred that R, R', and R" are independently selected form unsubstituted linear, branched or cyclic alkyl groups having 1 to 7 carbons. In certain embodiments, the preferred diluent has 4 or more, more preferably 5 or more total carbons, because the higher molecular weight diluents have lower volatility, and lower flammability. When one of the R, R' and R" is H, the structure forms a secondary alcohol. When none of the R, R' and R" are H, the structure forms a tertiary alcohol. Tertiary alcohols are more preferred than secondary alcohols. The diluents are preferably inert and easily displaceable by water when the total number of carbons is five or less.

Examples of useful secondary alcohols include 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, and the like.

Examples of useful tertiary alcohols include tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, and the like.

Examples of useful carboxylic acids include $C_2$-$C_{16}$, carboxylic acids, with one or two carboxylic acid groups and optionally a phenyl group. Specific examples include acetic acid, decanoic acid, dodecanoic acid, octanoic acid, benzylic acid, combinations thereof and the like.

A single alcohol or mixtures of two or more of the above-listed alcohols or two or more alcohols according to the structure above can be used as the diluent to make the polymer of this invention.

The diluent may be selected from secondary and tertiary alcohols having at least 4 carbons. Suitable examples include tert-butanol, tert-amyl alcohol, 2-butanol, 2-methyl-2-pentanol, 2,3-dimethyl-2-butanol, 3-methyl-3-pentanol, 3-ethyl-3-pentanol, 3,7-dimethyl-3-octanol. It has been found secondary and tertiary alcohols having at least 4 carbon atoms, even in relatively low amounts, have a beneficial effect on the modulus of the final polymer. These alcohols, such as t-amyl alcohol, even in amounts as low as 20-20 wt %, can lower the modulus of the resulting polymer by about 20%.

The diluent may also be selected from hexanol, heptanol, octanol, nonanol, decanol, tert-butyl alcohol, 3-methyl-3-pentanol, isopropanol, t amyl alcohol, ethyl lactate, methyl lactate, i-propyl lactate, 3,7-dimethyl-3-octanol, dimethyl formamide, dimethyl acetamide, dimethyl propionamide, N methyl pyrrolidinone and mixtures thereof. Additional diluents useful for this invention are disclosed in U.S. Pat. No. 6,020,445, US20100280146 which is incorporated herein by reference.

In another embodiment the diluent is selected from t-amyl alcohol, 3-methyl-3-pentanol, 3,7-dimethyl-3-octanol, decanoic acid, and combinations thereof and the like.

In one embodiment of the present invention the diluent is water soluble at processing conditions and readily washed out of the lens with water in a short period of time. Suitable water soluble diluents include 1-ethoxy-2-propanol, 1-methyl-2-propanol, t-amyl alcohol, tripropylene glycol methyl ether, isopropanol, 1-methyl-2-pyrrolidone, N,N-dimethylpropionamide, ethyl lactate, dipropylene glycol methyl ether, mixtures thereof and the like. The use of a water soluble diluent allows the post molding process to be conducted using water only or aqueous solutions which comprise water as a substantial component.

The diluents may be used in amounts up to about 40% by weight of the total of all components in the reactive mixture. In one embodiment the diluent(s) are used in amounts less than about 30% and in another in amounts between about 5 and about 20% by weight of the total of all components in the reactive mixture.

The diluent may also comprise additional components to lower the modulus of the resulting polymers and improve the lens curing efficiency and reducing residuals. Components capable of increasing the viscosity of the reactive mixture and/or increasing the degree of hydrogen bonding with the slow-reacting hydrophilic monomer, are desirable. Suitable components include polyamides, polylactams, such as PVP and copolymers thereof, polyols and polyol containing components such glycerin, boric acid, boric acid glycerol esters, polyalkylene glycols, combinations thereof and the like.

Suitable polylactams include PVP and copolymers comprising repeating units from NVP and hydrophilic monomers. In one embodiment, the polylactam is selected from, PVP, and the polyamide comprises DMA.

When polyamides or polylactams are used they have a molecular weight of between about K12-K120 (about 3900 to about 3,000,000 Dalton $M_w$) and in some embodiments from K30 to K90 (about 42,000 to about 1,300,000 Dalton $M_w$).

Suitable polyalkylene glycols include polyethylene glycol and polypropylene glycols having molecular weight up to about 350 and in some embodiments less than about 200 gm/mol.

When used, the polyols and polyol containing components are used in amounts less than about 5 wt % and in some embodiments from about 0.2 to about 5 wt %. The diluents and codiluents of the present invention also reduce the residuals remaining in the polymer at the end of the photocure. This provides lenses with more consistent properties, including diameter. In some embodiments the residual slow-reacting hydrophilic component present at the end of cure are less than about 2 wt % of the lens ((wt of residual component/wt of cured polymer)*100%), less than about 1 wt % and in some cases less than about 0.8 wt %. The reduction in residuals also leads to more consistent lens properties, including lens diameters, which can vary by less than about 0.05 mm.

The reactive mixture may contain additional components such as, but not limited to, medicinal agents, antimicrobial compounds, reactive tints, pigments, copolymerizable and non-polymerizable dyes, including UV blockers, photochromic compounds, spectral filtering dyes, release agents and combinations thereof The range of slow-reacting hydrophilic monomer in the reaction mixture include from about 37 to about 70 wt %, from about 39 to about 60 weight percent. The hydroxyalkyl monomers are present in amounts suitable to provide a molar ratio of hydroxyalkyl monomer to slow-reacting hydrophilic monomer of about 0.15 to about 0.4. Suitable ranges of silicone-containing component(s) are from about 20 to about 60 weight %, and in some embodiments from about 30 to about 55 weight % of the reactive components in the reaction mixture. The reaction mixtures also comprise from about 0.2 to about 3 weight % of a crosslinking monomer, from about 0 to about 3 weight % of a UV absorbing monomer, (all based upon the weight % of all reactive components) and where diluent is desired, about 20 to about 60 weight % (weight % of all components, both reactive and non-reactive) of one or more of the claimed diluents. It should be appreciated that the foregoing ranges may be combined in any permutation.

In one embodiment the hydroxyalkyl monomer comprises GMMA and the diluent comprises t-amyl alcohol.

The reaction mixtures of the present invention can be formed by any of the methods known to those skilled in the art, such as shaking or stirring, and used to form polymeric articles or devices by known methods.

For example, the biomedical devices of the invention may be prepared by mixing reactive components and the diluent(s) with a polymerization initiator and curing by appropriate conditions to form a product that can be subsequently formed into the appropriate shape by lathing, cutting and the like. Alternatively, the reaction mixture may be placed in a mold and subsequently cured into the appropriate article.

Various processes are known for processing the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. In one embodiment, the method for producing contact lenses comprising the polymer of this invention is by the direct molding of the silicone hydrogels, which is economical, and enables precise control over the final shape of the hydrated lens. For this method, the reaction mixture is placed in a mold having the shape of the final desired silicone hydrogel, i.e., water-swollen polymer, and the reaction mixture is subjected to conditions whereby the monomers polymerize, to thereby produce a polymer/diluent mixture in the shape of the final desired product.

Referring to FIG. 1, a diagram is illustrated of an ophthalmic lens 100, such as a contact lens, and mold parts 101-102 used to form the ophthalmic lens 100. In some embodiments, the mold parts include a back surface mold part 101 and a front surface mold part 102. As used herein, the term "front surface mold part" refers to the mold part whose concave surface 104 is a lens forming surface used to form the front surface of the ophthalmic lens. Similarly, the term "back surface mold part" refers to the mold part 101 whose convex surface 105 forms a lens forming surface, which will form the back surface of the ophthalmic lens 100. In some embodiments, mold parts 101 and 102 are of a concavo-convex shape, preferably including planar annular flanges, which surround the circumference of the uppermost edges of the concavo-convex regions of the mold parts 101-102.

Typically, the mold parts 101-102 are arrayed as a "sandwich". The front surface mold part 102 is on the bottom, with the concave surface 104 of the mold part facing upwards. The back surface mold part 101 can be disposed symmetrically on top of the front surface mold part 102, with the convex surface 105 of the back surface mold part 101 projecting partially into the concave region of the front surface mold part 102. In one embodiment, the back surface mold part 101 is dimensioned such that the convex surface 105 thereof engages the outer edge of the concave surface 104 of the front mold part 102 throughout its circumference, thereby cooperating to form a sealed mold cavity in which the ophthalmic lens 100 is formed.

In some embodiments, the mold parts 101-102 are fashioned of thermoplastic and are transparent to polymerization-initiating actinic radiation, by which is meant that at least some, and in some embodiments all, radiation of an intensity and wavelength effective to initiate polymerization of the reaction mixture in the mold cavity can pass through the mold parts 101-102.

For example, thermoplastics suitable for making the mold parts can include: polystyrene; polyvinylchloride; polyolefin, such as polyethylene and polypropylene; copolymers or mixtures of styrene with acrylonitrile or butadiene, polyacrylonitrile, polyamides, polyesters, cyclic olefin copolymers such as Topas available from Ticona or Zeonor available from Zeon, copolymers and blends of any of the foregoing, or other known material.

Following polymerization of the reaction mixture to form a lens 100, the lens surface 103 will typically adhere to the mold part surface 104. The steps of the present invention facilitate release of the surface 103 from the mold part surface.

The first mold part 101 can be separated from the second mold part 102 in a demolding process. In some embodiments, the lens 100 will have adhered to the second mold part 102 (i.e. the front curve mold part) during the cure process and remain with the second mold part 102 after separation until the lens 100 has been released from the front curve mold part 102. In other embodiments, the lens 100 can adhere to the first mold part 101.

The lens 100 may be removed from the mold part may be released from the mold by any process, including contacting with a solvent or dry release. In one embodiment, the lens 100 and the mold part to which it is adhered after demolding are contacted with an aqueous solution. The aqueous solution can be heated to any temperature below the boiling point of the aqueous solution, and preferably at least about 10° C. below the boiling point of the high boiling point diluent. In some embodiments the aqueous solution is heated to a temperature which is at least about 10° C. lower than the boiling point of the diluent having the lowest boiling point. Heating can be accomplished with a heat exchange unit to minimize the possibility of explosion, or by any other feasible means or apparatus for heating a liquid.

As used herein, processing includes the steps of removing the lens from the mold and removing or exchanging the diluent with an aqueous solution. The steps may be done separately, or in a single step or stage. The processing temperature may be any temperatures between about 30° C. and the boiling point of the aqueous solutions, in some embodiments between about 30° C. and about 95° C., and in some embodiments between about 50° C. and about 95° C.

The aqueous solution is primarily water. In some embodiments, the aqueous solution is at least about 70 wt % water, and in other embodiments at least about 90 weight % water and in other embodiments at least about 95%. The aqueous solution may also be a contact lens packaging solution such as borate buffered saline solution, sodium borate solutions, sodium bicarbonate solutions and the like. The aqueous solution may also include additives, such as surfactants, preservatives, release aids, antibacterial agents, pharmaceutical and nutriceutical components, lubricants, wetting agents, salts, buffers, mixtures thereof and the like. Specific examples of additives which may be included in the aqueous solution include Tween®80, which is polyoxyethylene sorbitan monooleate, Tyloxapol, octylphenoxy (oxyethylene) ethanol, amphoteric 10), EDTA, sorbic acid, DYMED, chlorhexadine gluconate, hydrogen peroxide, thimerosal, polyquad, polyhexamethylene biguanide, mixtures thereof and the like. Where various zones are used, different additives may be included in different zones. In some embodiments, additives can be added to the hydration solution in amounts varying between 0.01% and 10% by weight, but cumulatively less than about 10% by weight.

Exposure of the ophthalmic lens 100 to the aqueous solution can be accomplished by any method, such as washing, spraying, soaking, submerging, or any combination of the aforementioned. For example, in some embodiments, the lens 100 can be washed with an aqueous solution comprising deionized water in a hydration tower.

In embodiments using a hydration tower, front curve mold parts 102 containing lenses 100 can be placed in pallets or trays and stacked vertically. The aqueous solution can be introduced at the top of the stack of lenses 100 so that the solution will flow downwardly over the lenses 100. The solution can also be introduced at various positions along the tower. In some embodiments, the trays can be moved upwardly allowing the lenses 100 to be exposed to increasingly fresher solution.

In other embodiments, the ophthalmic lenses 100 are soaked or submerged in the aqueous solution.

The contacting step can last up to about 12 hours, in some embodiments up to about 2 hours and in other embodiments from about 2 minutes to about 2 hours; however, the length of the contacting step depends upon the lens materials, including any additives, the materials that are used for the solutions or solvents, and the temperatures of the solutions. Sufficient treatment times typically shrink the contact lens and release the lens from the mold part. Longer contacting times will provide greater leaching.

The volume of aqueous solution used may be any amount greater than about 1 ml/lens and in some embodiments greater than about 5 ml/lens.

In some methods, after separation or demolding, the lenses on the front curves, which may be part of a frame, are mated with individual concave slotted cups to receive the contact lenses when they release from the front curves. The cups can be part of a tray. Examples can include trays with 32 lenses each, and 20 trays that can be accumulated into a magazine.

According to another embodiment of the present invention the lenses are submerged in the aqueous solution. In one embodiment, magazines can be accumulated and then lowered into tanks containing the aqueous solution. The aqueous solution may also include other additives as described above.

As used herein clarity means substantially free from visible haze. Clear lenses have a haze value of less than about 100%, less than about 50%, less than about 20%, and less than about 15%.

The contact lenses of the present invention may further comprise modulus values less than about 150, about 120 and about 100 psi.

The biomedical devices, and particularly ophthalmic devices and contact lenses have average contact angles (advancing) which are less than about 80°, less than about 70° and less than about 60°. In some embodiments the articles of the present invention have combinations of the above described oxygen permeability, water content and contact angle. All combinations of the above ranges are deemed to be within the present invention.

Hansen Solubility Parameter

The Hansen solubility parameter, $\delta p$ may be calculated by using the group contribution method described in Barton, CRC Handbook of Solubility Par., 1st. Ed. 1983, page 85-87 and using Tables 13, 14.

Haze Measurement

Haze is measured by placing a hydrated test lens in borate buffered saline in a clear 20×40×10 mm glass cell at ambient temperature above a flat black background, illuminating from below with a fiber optic lamp (Dolan-Jenner PL-900 fiber optic light. fiber optic light with 0.5" diameter light guide set at a power setting of 4-5.4) at an angle 66° normal to the lens cell, and capturing an image of the lens from above, normal to the lens cell with a video camera (DVC 1300C:19130 RGB camera with Navitar TV Zoom 7000 zoom lens) placed 14 mm above the lens platform. The background scatter is subtracted from the scatter of the lens by subtracting an image of a blank cell using EPIX XCAP V 2.2 software. The subtracted scattered light image is quantitatively analyzed, by integrating over the central 10 mm of the lens, and then comparing to a −1.00 diopter CSI Thin Lens®, which is arbitrarily set at a haze value of 100, with no lens set as a haze value of 0. Five lenses are analyzed and the results are averaged to generate a haze value as a percentage of the standard CSI lens. Lenses have haze levels of less than about 150% (of CSI as set forth above) and in some cases less than about 100%. Alternatively, instead of a −1.00 diopter CSI Thin Lenses®, a series of aqueous dispersions of stock latex spheres (commercially available as 0.49 μm Polystyene Latex Spheres—Certified Nanosphere Size Standards from Ted Pella, Inc., Product Number 610-30) can be used as standards. A series of calibration samples were prepared in deionized water. Each solution of varying concentration was placed in a cuvette (2 mm path length) and the solution haze was measured using the above method.

| Solution | Concentration (wt % × 10⁻⁴) | Mean GS |
| --- | --- | --- |
| 1 | 10.0 | 533 |
| 2 | 6.9 | 439 |
| 3 | 5.0 | 379 |
| 4 | 4.0 | 229 |
| 5 | 2.0 | 172 |
| 6 | 0.7 | 138 |

Mean GS = mean gray scale

A corrective factor was derived by dividing the slope of the plot of Mean GS against the concentration (47.1) by the slope of an experimentally obtained standard curve, and multiplying this ratio times measured scatter values for lenses to obtain GS values.

"CSI haze value" may be calculated as follows:

$$\text{CSI haze value} = 100 \times (GS - BS)/(217 - BS)$$

Where GS is gray scale and BS is background scatter.

Water Content

The water content of contact lenses was measured as follows: Three sets of three lenses are allowed to sit in packing solution for 24 hours. Each lens is blotted with damp wipes and weighed. The lenses are dried at 60° C. for four hours at a pressure of 0.4 inches Hg or less. The dried lenses are weighed. The water content is calculated as follows:

$$\% \text{ water content} = \frac{(\text{wet weight} - \text{dry weight})}{\text{wet weight}} \times 100$$

The average and standard deviation of the water content are calculated for the samples and are reported.

Modulus

Modulus is measured by using the crosshead of a constant rate of movement type tensile testing machine equipped with a load cell that is lowered to the initial gauge height. A suitable testing machine includes an Instron model 1122. A dog-bone shaped sample having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. Twelve specimens of each composition are measured and the average is reported. Percent elongation is =[(Lf−Lo)/Lo]×100. Tensile modulus is measured at the initial linear portion of the stress/strain curve.

Advancing Contact Angle

All contact angles reported herein are advancing contact angles. The advancing contact angle was measured as follows. Four samples from each set were prepared by cutting out a center strip from the lens approximately 5 mm in width and equilibrated in packing solution. The wetting force between the lens surface and borate buffered saline is measured at 23° C. using a Wilhelmy microbalance while the sample is being immersed into or pulled out of the saline. The following equation is used $$F = 2\gamma p \cos\theta \text{ or } \theta = \cos^{-1}(F/2\gamma p)$$

where F is the wetting force, γ is the surface tension of the probe liquid, p is the perimeter of the sample at the meniscus and θ is the contact angle. The advancing contact angle is obtained from the portion of the wetting experiment where the sample is being immersed into the packing solution. Each sample was cycled four times and the results were averaged to obtain the advancing contact angles for the lens.

Oxygen Permeability (Dk)

The Dk is measured as follows. Lenses are positioned on a polarographic oxygen sensor consisting of a 4 mm diameter gold cathode and a silver ring anode then covered on the upper side with a mesh support. The lens is exposed to an atmosphere of humidified 2.1% $O_2$. The oxygen that diffuses through the lens is measured by the sensor. Lenses are either stacked on top of each other to increase the thickness or a thicker lens is used. The L/Dk of 4 samples with significantly different thickness values are measured and plotted against the thickness. The inverse of the regressed slope is the Dk of the sample. The reference values are those measured on commercially available contact lenses using this method. Balafilcon A lenses available from Bausch & Lomb give a measurement of approx. 79 barrer. Etafilcon lenses give a measurement of 20 to 25 barrer. (1 barrer=$10^{-10}$ ($cm^3$ of gas×$cm^2$)/($cm^3$ of polymer×sec×cm Hg)).

Lysozyme Uptake

Lysozyme uptake was measured as follows: The lysozyme solution used for the lysozyme uptake testing contained lysozyme from chicken egg white (Sigma, L7651) solubilized at a concentration of 2 mg/ml in phosphate saline buffer supplemented by Sodium bicarbonate at 1.37 g/l and D-Glucose at 0.1 g/l.

Three lenses for each example were tested using each protein solution, and three were tested using PBS (phosphate buffered saline) as a control solution. The test lenses were blotted on sterile gauze to remove packing solution and aseptically transferred, using sterile forceps, into sterile, 24 well cell culture plates (one lens per well) each well containing 2 ml of lysozyme solution. Each lens was fully immersed in the solution. 2 ml of the lysozyme solution was placed in a well without a contact lens as a control.

The plates containing the lenses and the control plates containing only protein solution and the lenses in the PBS, were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile conical tubes (1 lens per tube), each tube containing a volume of PBS determined based upon an estimate of lysozyme uptake expected based upon on each lens composition. The lysozyme concentration in each tube to be tested needs to be within the albumin standards range as described by the manufacturer (0.05 microgram to 30 micrograms). Samples known to uptake a level of lysozyme lower than 100 μg per lens were diluted 5 times. Samples known to uptake levels of lysozyme higher than 500 μg per lens (such as etafilcon A lenses) are diluted 20 times.

1 ml aliquot of PBS was used for all samples other than etafilcon. 20 ml were used for etafilcon A lens. Each control lens was identically processed, except that the well plates contained PBS instead of lysozyme solution.

Lysozyme uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in lysozyme solution.

Optical density was measured using a SynergyII Microplate reader capable for reading optical density at 562 nm.

Lipocalin uptake was measured using the following solution and method. The lipocalin solution contained B Lactoglobulin (Lipocalin) from bovine milk (Sigma, L3908) solubilized at a concentration of 2 mg/ml in phosphate saline buffer (Sigma, D8662) supplemented by sodium bicarbonate at 1.37 g/l and D-Glucose at 0.1 g/l.

Three lenses for each example were tested using the lipocalin solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of lipocalin solution. Each lens was fully immersed in the solution. Control lenses were prepared using PBS as soak solution instead of lipocalin. The plates containing the lenses immersed in lipocalin solution as well as plates containing control lenses immersed in PBS, were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile 24 well plates each well containing 1 ml of PBS solution.

Lipocalin uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in lipocalin solution. Optical density was measured using a SynergyII Micro-plate reader capable for reading optical density at 562 nm.

Mucin uptake was measured using the following solution and method. The Mucin solution contained Mucins from bovine submaxillary glands (Sigma, M3895-type 1-S) solubilized at a concentration of 2 mg/ml in phosphate saline buffer (Sigma, D8662) supplemented by sodium bicarbonate at 1.37 g/l and D-Glucose at 0.1 g/l.

Three lenses for each example were tested using Mucin solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of Mucin solution. Each lens was fully immersed in the solution. Control lenses were prepared using PBS as soak solution instead of lipocalin.

The plates containing the lenses immersed in Mucin as well as plates containing control lenses immersed in PBS were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile 24 well plates each well containing 1 ml of PBS solution.

Mucin uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in Mucin solution. Optical density was measured using a SynergyII Micro-plate reader capable for reading optical density at 562 nm.

Kinetics

The kinetic half lives for components may be determined as follows. The components for each kinetics example were weighed into a 20 mL amber borosilicate glass scintillation vial (Wheaton 320 brand; Catalogue #80076-576, or equivalent). Vials were capped (using PTFE lined green cap, Qorpak; Supplier #5205/100, Catalogue #16161-213) and rolled on jar roller until all solids were dissolved and a homogeneous mixtures were obtained.

Degas

Figure 2:
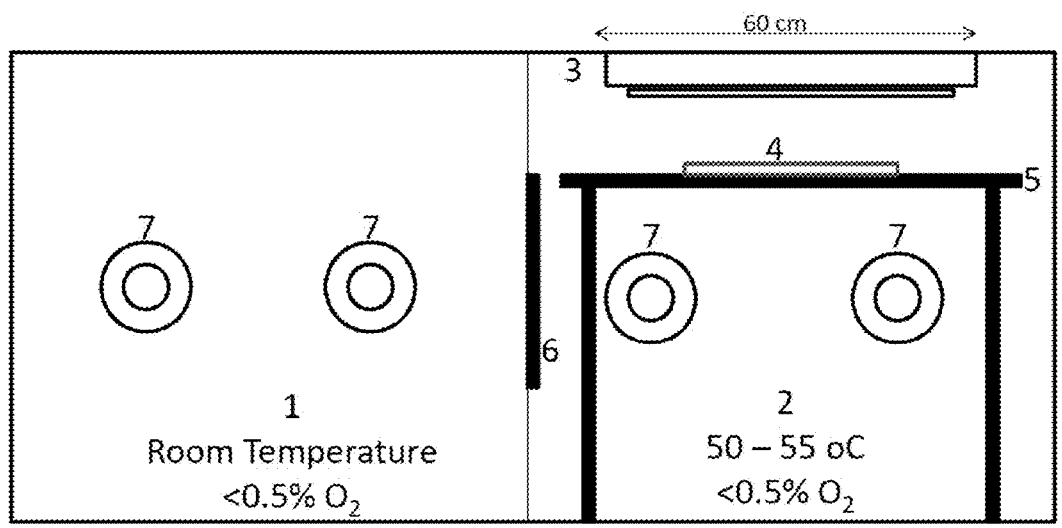
FIG. 2 is a schematic of the cure chamber described herein.

Reactive monomer mixes were degassed under vacuum, under yellow light for 7-10 minutes, and back-filling with nitrogen after breaking vacuum. Vials were quickly capped and placed in compartment 1 of a two compartment nitrogen cure box, via the gated aperature, 7, as shown in FIG. 2. The conditions in compartment 1 were room temperature and <0.5% oxygen (using continuous nitrogen purge).

Nitrogen Cure Box—Compartment 2

The oxygen level in both compartments was maintained by continuous/constant nitrogen purge. The temperature in Compartment 2 was maintained by a heater (COY, Laboratory Products Inc.). The nitrogen cure box was allowed to equilibrate for a minimum of 4 hours prior to performing each kinetics study. The degassed reactive mixture (in tightly capped amber vial) was placed in compartment 1 during the equilibration period.

Light Source and Intensity Setting

Figure 3:
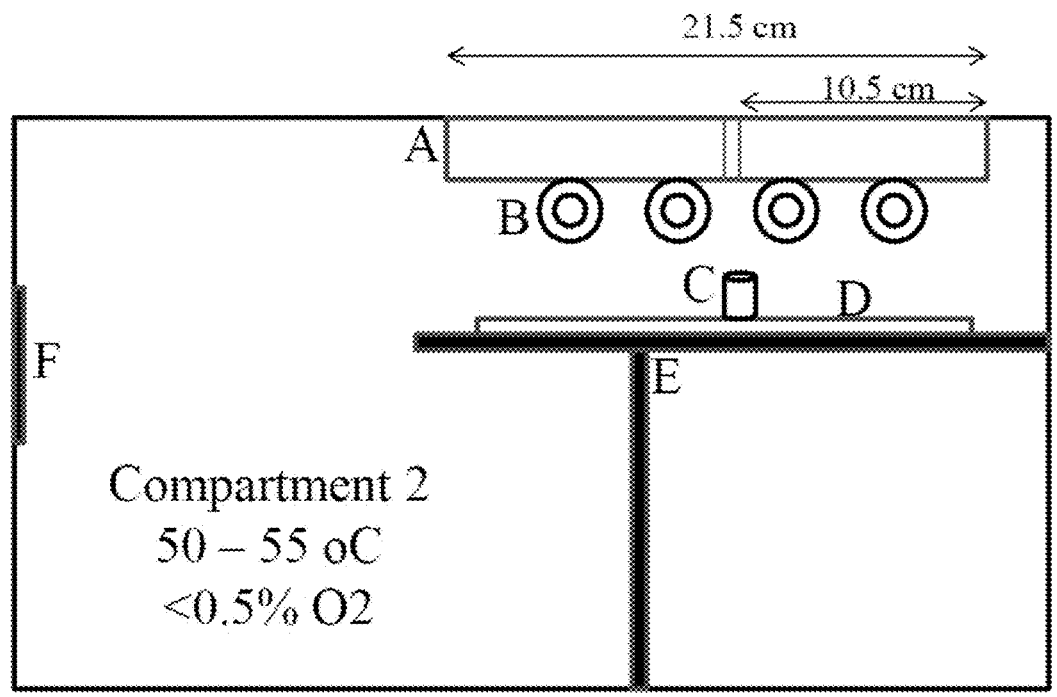
FIG. 3 is a schematic of compartment 2 of the cure box show in FIG. 2

As depicted in FIG. 3, 2 fluorescent light fixtures (Lithonia Lighting Fluorescent Luminaire (Gas Tube Luminaire), 60 cm×10.5 cm) each equipped with 2 fluorescent lamps (Philips TLK 40W/03, 58 cm) were arranged in parallel. The cure intensity was attenuated by adjusting the height of the shelf (shown in FIGS. 2 and 3) relative to the light source. The intensity at a given shelf height was measured by placing the sensor of a calibrated radiometer/photometer on the mirrored surface, consistent with the position of the sample, as shown in FIG. 3. The sensor was placed directly under the space between the $2^{nd}$ and $3^{rd}$ lamps in the 4 lamps arrangement.

Using a calibrated analytical balance (4 decimal places) the weight of a clear borosilicate glass scintillation vial (Wheaton 986541) with cap (white cap with polyethylene insert) was determined. The vial with cap was transferred to Compartment 1 of the Nitrogen Cure Box. The cap was unscrewed and using a calibrated 10-100 μL Eppendorf Pipet, 100 μL of the Reactive Monomer Mixture was transferred into the vial. The vial was tightly capped, quickly moved into Compartment 2, via door 6, and placed on the mirrored surface 4, as shown in FIG. 2. The sample was placed directly under the space between the $2^{nd}$ and $3^{rd}$ lamps in the 4 lamps arrangement. The light source 3, was turned on and the sample was exposed for a specified time period. Although the light source was set at 4-5 mW/cm$^2$, the actual intensity reaching the sample is 0.7-1.3 mW/cm$^2$, due the cap on the sample glass vials. After exposure, the light source 3, was turned off and the vial (with cap) was re-weighed to determine the sample weight by difference. Using a calibrated 500-5000 μL Eppendorf Pipet, 10 mL HPLC grade methanol was added to the vial.

Aliquots (100 μL) of the Reactive Monomer Mixture were pipetted into separate borosilicate glass scintillation vials and the above procedure described above was performed to generate samples at the following minimum time points (minutes): 0, 0.25, 0.50, 0.75, 1, 2, 4, 6, 8, 10.

Cured polymers were extracted in methanol overnight by gently shaking at room temperature.

Extracts were analyzed for residual components by High Performance Liquid Chromatography with UV detection (HPLC/UV) using the following procedures.

Quantitation of the mPDMS in the extracts was performed against external calibration standards (about 6-11, using the response of the n=6 oligomer), typically covering the range of 1 μg/mL-800 μg/mL. If the concentrations of mPDMS in the extracts were outside the calibration range, the extracts were diluted with methanol to render concentrations within the calibration range for more accurate quantitation.

Chromatographic Conditions
Column: Agilent Zorbax Eclipse XDB18, 4.6×50 mm×1.8 μm
Column Temperature: 30° C.
UV Detector: 217 nm
Injection Volume: 20 μL
Mobile Phase
Eluent A: De-ionized
Eluent B: Acetonitrile
Eluent C: Isopropanol
Flow Rate: 1 mL/min

| Time (mins) | % A | % B | % C |
|---|---|---|---|
| 0.0 | 50 | 48 | 2 |
| 0.5 | 50 | 48 | 2 |
| 2.0 | 0 | 60 | 40 |
| 5.0 | 0 | 60 | 40 |
| 5.1 | 0 | 30 | 70 |
| 8.0 | 0 | 30 | 70 |
| 8.1 | 50 | 48 | 2 |
| 10.0 | 50 | 48 | 2 |

Quantitation of the components in the extracts other than mPDMS was performed against external calibration standards (about 6-11) for each component, typically covering the range of 1 μg/mL-800 μg/mL. If the concentrations of components in the extracts were outside the calibration range, the extracts were appropriately diluted with methanol to render concentrations within the calibration range for more accurate quantitation.

Chromatographic Conditions
Column: Agilent Zorbax Eclipse Plus 18, 4.6×75 mm×1.8 μm
Column Temperature: 30° C.
UV Detector: 217 nm
Injection Volume: 5 μL
Mobile Phase
Eluent A: De-ionized water with 0.05% $H_3PO_4$
Eluent B: Acetonitrile with 0.05% $H_3PO_4$
Eluent C: Methanol
Flow Rate: 1 mL/min

| Time (mins) | % A | % B | % C |
|---|---|---|---|
| 0 | 95 | 5 | 0 |
| 5 | 95 | 5 | 0 |
| 15 | 0 | 100 | 0 |
| 23 | 0 | 100 | 0 |
| 24 | 0 | 30 | 70 |
| 28 | 0 | 30 | 70 |
| 29 | 95 | 5 | 0 |
| 35 | 95 | 5 | 0 |

Calculations
1. At each time point the following values are determined:
The concentration (μg/mL) of each component in the sample extract.
The concentration of each component in the sample extract, expressed as a percent of the sample weight as follows:

% Component=[(μg/mL*Volume of Extract*Dilution Factor*$10^{-6}$ g/μg)/(g Sample Weight)]*100

The percent unreacted component present, expressed as a percent relative to $T_0$ (where $T_0$ represented 100% unreacted component)

% at $T_x$=(% Measured at $T_x$/% Measured at $T_0$)*100

2. Using the % Component calculated above, the concentration of each component in μmoles/g, is calculated as follows:

μmoles/g=(% Component*$10^3$)/(Molecular Weight of Component)

3. Using the concentration of each component determined in μmoles/g in step 2, the concentration at $Time_x$ was expressed as Log $[A_x]/[A_o]$, where $[A_x]$ is the concentration of component A at x minutes and
$[A_o]$ is the concentration of component A at 0 minutes ($T_0$)
The expression Log $[A_x]/[A_o]$ was determined for each time point.
First order kinetics were assumed for determining both the polymerization kinetics rate and half life for each component. The following equations were used for calculating polymerization rate Log $[A]/[A_0]=-kt/2.303$ and half life ln $[A_0]/[0.5A_0]=kt_{1/2}$ or $t_{1/2}=0.693/k$ For each component, a plot of Log $[A_x]/[A_0]$ versus time (minutes) was generated. Typically, the data points (x, y) that best correspond to linear growth (shorter cure times) were plotted and the data were fitted to a linear equation.

Using the slope, the kinetic rate constant (k) of each component was evaluated from the following equation:

$k$(minute$^{-1}$)=Slope*-2.303

The half-life (minutes) of each component was evaluated from the following equation:

$t_{1/2}=0.693/k$

The evaluated half-life for each component was compared to the data generated for the percent of each component relative to $T_0$, at each time point. Typically for each component, the time taken to attain 50% consumption was close to the half-life based on $1^{st}$ order kinetics In cases where the two were significantly different (typically about 30% for half-life of less than about 1 minute, 25% for half-life less than about 2.5 minutes but greater than 1 minute and 20% for half-life greater than 2.5 minutes), the data points (x, y) were re-evaluated to generate kinetic rate constants (k) which would provide half-lives (based on $1^{st}$ order considerations) more consistent (within 20%) with the measured values.

The Examples below further describe this invention, but do not limit the invention. They are meant only to suggest a method of practicing the invention. Those knowledgeable in the field of contact lenses as well as other specialties may find other methods of practicing the invention. However, those methods are deemed to be within the scope of this invention.

Some of the other materials that are employed in the Examples are identified as follows:

EXAMPLES

The following abbreviations are used in the examples below:
FC Front mold curves
BC Back mold curves
SiMAA (3-methacryloxy-2-hydroxypropoxy)propyl-bis(trimethylsiloxy)methylsilane (Also known as SiGMA)
DMA N,N-dimethylacrylamide HEMA 2-hydroxyethyl methacrylate
HEAA hydroxyethylacrylamide
HBMA 2-hydroxybutyl methacrylate, prepared as in Synthetic Example 1
HPMA 2-hydroxypropyl methacrylate (ACROS)
DMHEMA dimethylhydroxyethylmethacrylate, prepared as in Synthetic Example 2
mPDMS 800-1000 MW ($M_n$) monomethacryloxypropyl terminated mono-n-butyl terminated polydimethylsiloxane
OH-mPDMS α-(2-hydroxy-1-methacryloxypropyloxypropyl)-ω-butyl-decamethylpentasiloxane, (MW 612 g/mol), prepared as in Example 8 of US20100249356 A1
Norbloc 2-(2'-hydroxy-5-methacrylyloxyethylphenyl)-2H-benzotriazole
D3O 3,7-dimethyl-3-octanol
IPA isopropyl alcohol
TAC triallylcyanurate
TEGDMA tetraethyleneglycol dimethacrylate
TRIS 3-methacryloxypropyltris(trimethylsiloxy)silane
acPDMS bis-3-methacryloxy-2-hydroxypropyloxypropyl polydimethylsiloxane (MW about 1000 g/mole)
CGI 819 bis(2,4,6-trimethylbenzoyl)-phenylphosphineoxide
EtOAc ethyl acetate
DA decanoic acid
Macromer A Described in Example 25 of U.S. Pat. No. 6,943,203
GMMA 2,3-dihydroxypropyl methacrylate
TAA t-amyl alcohol
ETOH ethanol
SA-2 N-(2,3-dihydroxypropane)-N'-(propyl tetra(dimethylsiloxy)dimethylbutylsilane)acrylamide, as shown in Formula XI

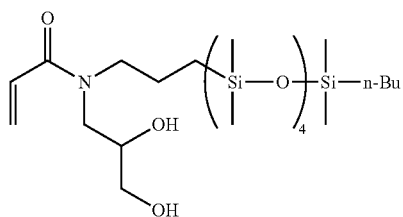

NVP N-vinylpyrrolidone
PVP poly(N-vinylpyrrolidone)
VINAL an ionic amide containing vinyl ether having the structure

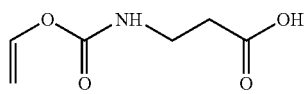

and prepared in Synthetic Preparation 1.
BAE (Boric Acid Ester) was Formed as Follows:
1.24 parts of a 5% (wt) solution of ethylenediaminetetraacetic acid, 299 parts (wt) glycerol and 100 parts (wt) boric acid were added to a reaction flask. The mixture was heated with stirring to 90° C. Vacuum was applied to reduce the pressure to less than 6 torr as the mixture was stirred for 155 minutes, with removal of water vapor. The pressure was reduced to less than 2 torr and the reaction was continued for 2 hours, or longer as needed until the % water of the mixture was reduced to less than 0.2% using a Karl Fischer test.

BAGE (Boric Acid Glycerol Ester) was Formed as Follows:
To BAE prepared as described above was added 624 parts (wt) glycerol with stirring for 60 minutes at 35-40° C.

Comparative Example

A reaction mixture formed by mixing the components listed in Table 1 with a diluent (50% ethanol/50% ethyl acetate) in mixtures of 80% reactive components/20% diluents. The reaction mixture was degassed by applying vacuum at ambient temperature for about 17(±3) minutes. The reaction mixture was then dosed into thermoplastic contact lens molds (front curves made from Zeonor, and back curves from polypropylene), and cured for about 20 minutes at 45° C., under a nitrogen atmosphere, using Philips TL 20W/03T fluorescent bulbs and 4-5 mW/cm². The resulting lenses were released from the front curve molds using deionized water at ambient temperature transferred into vials containing borate buffered saline for at least 24 hours and then autoclaved at 122° C. for 30 minutes. The resulting lenses were hazy, but felt lubricious when rubbed between the thumb and forefinger.

The percent haze was measured and the results are listed in Table 1.

Examples 1 and 2

The Comparative Example was repeated, except that the HEMA was increased and NVP was decreased as shown in Table 1, below. The lenses were released from the front curve mold using mechanical force and extracted in di-ionized water at ambient temperature and pressure. Both lenses felt lubricious when rubbed between the thumb and index finger. The percent haze was measured for both lenses and is shown in Table 1, below.

TABLE 1

| | Ex. # | | |
| --- | --- | --- | --- |
| Component | Ex. 1 Wt % | Ex. 2 Wt % | CE1 Wt % |
| mPDMS 1000 | 20 | 20 | 20 |
| TRIS | 20 | 20 | 20 |
| NVP | 47 | 39.25 | 52 |
| HEMA | 10.75 | 18.5 | 5.75 |
| CGI 819 | 2 | 2 | 2 |
| TEGDMA | 0.25 | 0.25 | 0.25 |
| % Haze | 22 | 15 | 259 |

The lenses of the Comparative Example 1 were very hazy, displaying a haze value of 259%, while the lenses of Examples 1 and 2 had dramatically improved haze values of 22% and 15% respectively. The lenses of the Comparative Example were so hazy that they could not be used as contact lenses.

Examples 3-13

A series of lens formulations were formed from the following components:
38.5 wt % mPDMS
58.25 wt % NVP and HEMA, combined (individual amounts shown in Table 2).
2% Norbloc
1 wt % TEGDMA
0.25 CGI 819
The reactive components were mixed with a diluents (50% TAA/50% DA) in a ratio of 80 wt % reactive components:20 wt % diluent. The reaction mixtures were cast and cured into lenses following the process described in Examples 1 and 2. Lenses were released in 50/50 IPA/water, extracted in 70/30 IPA/water and subsequently equilibrated in de-ionized water. Lenses were transferred into vials containing borate buffered saline for at least 24 hours and then autoclaved at 122° C. for 30 minutes. Lens properties were measured and are reported in Table 2, below.

TABLE 2

| Ex# | [HEMA] wt % | [NVP] wt % | HEMA:NVP[1] | % H$_2$O | % Haze | DCA | Mechanicals Mod. (psi) | Elong. (%) | Dk | AC:RC |
|---|---|---|---|---|---|---|---|---|---|---|
| 3 | 5.75 | 52.50 | 0.0935 | 61.8 (0.1) | 479 (8) | 62 (4) | 53.2 (2.5) | 162.6 (34.8) | 102.1 | 54 |
| 4 | 6.75 | 51.50 | 0.112 | 61.4 (0.2) | 464 (20) | 54 (6) | 57.9 (3.6) | 187.3 (51.1) | 98.3 | 62 |
| 5 | 7.75 | 50.50 | 0.131 | 58.9 (0.1) | 233 (59) | 58 (5) | 61.6 (5.2) | 189.8 (50.4) | 102.1 | 69 |
| 6 | 8.75 | 49.50 | 0.152 | 58.2 (0.2) | 17 (17) | 60 (5) | 67.0 (3.9) | 157.4 (43.8) | 100.3 | 77 |
| 7 | 9.75 | 48.50 | 0.172 | 60.0 (0.3) | 5 (1) | 59.5 (5) | 70.6 (4) | 159.2 (47.5) | 96.3 | 85 |
| 8 | 10.75 | 47.50 | 0.193 | 59.1 (0.0) | 8 (0) | 60 (7) | 79.9 (1.9) | 196.2 (24.6) | 89.1 | 92 |
| 9 | 15.75 | 42.50 | 0.316 | 55.7 (0.0) | 11 (1) | 70 (7) | 97.5 (4.2) | 192.8 (39.2) | 83.5 | 131 |
| 10 | 18.75 | 39.50 | 0.405 | 51.7 (0.1) | 16 (2) | * NW | 102.5 (4.0) | 180.6 (38.6) | 77.3 | 154 |
| 11 | 21.75 | 36.50 | 0.509 | 49.7 (0.1) | 44 (2) | * NW | 115.9 (3.1) | 206.3 (53.8) | 62.3 | 177 |
| 12 | 25.75 | 32.50 | 0.677 | 46.5 (0.3) | 112 (4) | * NW | 119.6 (6.9) | 199.5 (46.6) | 63.2 | 208 |
| 13 | 29.00 | 29.25 | 0.839 | 40.7 (0.2) | 186 (3) | * NW | 138.8 (6.7) | 190.7 (32.4) | 59.7 | 233 |

1 molar ratio
AC:RC = mmol ancillary components/100 gm reactive mixture
* NW = Not Wettable As can be seen from Examples 3-5, lenses made from reaction mixtures containing less than about 8 wt % HEMA displayed very high haze values (>about 200%) which are unsuitable for a contact lens, while lenses having between 10 and 22 wt % HEMA displayed exceptionally good haze values (9-44%). It should also be noted that lenses formed from reaction mixtures having less than about 40 wt % NVP displayed poor wettabilities, and actually repelled water. Examples 3 through 13 also show that as the amount of HEMA is increased, the Dk of the lenses decrease by as much as 40% (comparing Example 6 to Example 13), even though the amount of the silicone-containing component, and the % silicon (12.089) in the reactive mixture remained the same.

Figure 4:
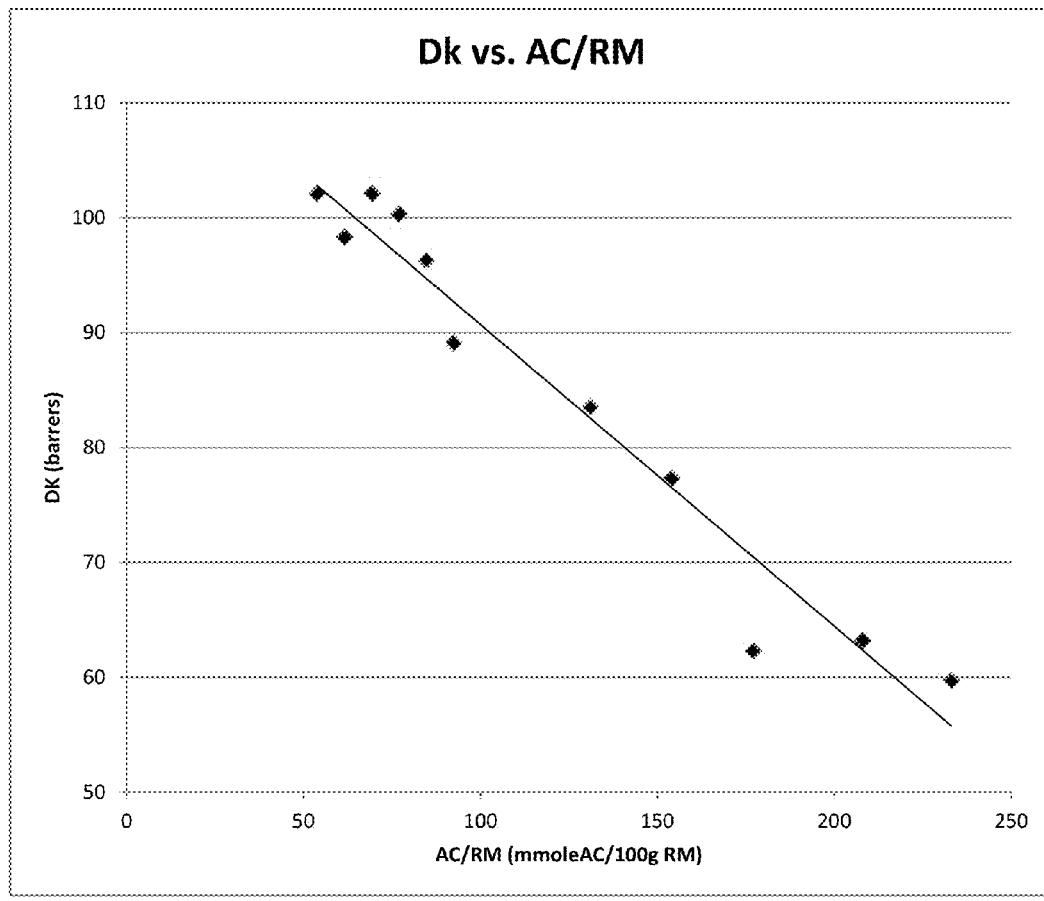
FIG. 4 is a graph of the Dk v. the ratio of ancillary components to reactive mixture (AC/RM) of the data from Examples 3-13.

The data from Table 2 is plotted in FIG. 4, and shows that as the ratio of ancillary components to reactive mixture decreases, the oxygen permeability of the silicone hydrogel increases.

Examples 14-16

A reaction mixture was formed by mixing the components listed in Table 3 with 20 wt % of a 50:50 mixture of TAA and decanoic acid and degassed by applying vacuum at ambient temperature for about 17(±3) minutes. The reaction mixture (75 μL) was then dosed at room temperature and <0.1% O$_2$, into thermoplastic contact lens molds (FC—Zeonor, BC Polypropylene) which had been degassed in N$_2$ box at RT (Compartment 1, FIG. 1) for a minimum of 12 hours prior to dosing. The BC was placed on the FC mold and the lenses were moved into Compartment 2 and cured for 20 minutes, at an intensity of 4-5 mW/cm$^2$, <0.1% O$_2$, and 62-65° C.

Lenses were released in 50/50 IPA/water, extracted in 70/30 IPA/water and subsequently equilibrated in de-ionized water. Lenses were transferred into vials containing borate buffered saline for at least 24 hours and then autoclaved at 122° C. for 30 minutes. Lens properties were measured and are reported in Table 4, below.

TABLE 3

| Component | 14 | 15 | 16 | 17 |
|---|---|---|---|---|
| mPDMS 1000 | 20.50 | 20.50 | 20.50 | 20.50 |
| NVP | 65.50 | 70.50 | 72.50 | 0 |
| DMA | 0 | 0 | 0 | 72.5 |
| HEMA | 10.75 | 5.75 | 3.25 | 3.25 |

TABLE 3-continued

| Component | 14 | 15 | 16 | 17 |
|---|---|---|---|---|
| TEGDMA | 1.00 | 1.00 | 1.50 | 1.50 |
| Norblock | 2.00 | 2.00 | 2.00 | 2.00 |
| CGI 819 | 0.25 | 0.25 | 0.25 | 0.25 |

TABLE 4

| Ex.# | % H$_2$O | % Haze | DCA | Mechanicals Mod. (psi) | Elong. (%) | Dk | AC:RM |
|---|---|---|---|---|---|---|---|
| 14 | 70.5 (0.2) | 4 (1) | 55 (6) | 51.0 (6.3) | 208.7 (37.5) | 48.9 | 92 |
| 15 | 78.1 (0.1) | 6 (0) | 50 (6) | 30.8 (2.6) | 224.9 (29.6) | 58.1 | 54 |
| 16 | 77.9 (0.3) | 30 (1) | 51 (7) | 29.7 (2.2) | 172.0 (36.0) | 61.0 | 36 |
| CE2 | 68.4 (0.3) | 1 (0) | 99 (4) | 138.6 (3.5) | 118.6 (32.3) | 37.8 | 769 |

The DMA in Comparative Example 2 is an intermediate reacting monomer. As can be seen from the AC:RM ratio replacing the NVP with DMA substantially decreases the Dk of the resulting lenses compared to those of Comparative Example 2.

Examples 17-22

Example 8 was repeated, except that the amount of hydroxylalkyl (meth)acrylate and NVP were varied to provide molar ratios of the hydroxylalkyl (meth)acrylate:NVP of about 0.2. GMMA has two hydroxyl groups. Accordingly, formulations having two different concentrations of GMMA were prepared, Example 21 (13.23 wt % GMMA, 0.408 ratio, counting both hydroxyls) and Example 22 (6.62 wt % GMMA, 0.204, counting two hydroxyl).

Examples 20 and 21 produces hazy reaction mixtures which were not cured into lenses. Examples 17-19 and 22 produced clear reaction mixtures which were cast into lenses following the procedure described in Example 8. Lens properties were measured. The formulations and lens properties are shown in Table 5, below.

Comparing Examples 21 and 22, it can be seen that when the molar amount of GMMA was adjusted to account for both hydroxyls, clear lenses were formed. It is believed that Example 20, which included HEAA as the hydroxyalkyl (meth)acrylate, did not provide wettable lenses because the HEAA contains two polar groups, the amide and hydroxyl groups, making the HEAA more polar than the other hydroxylalkyl (meth)acrylates used in Examples 18-19 and 21-22. It is believed that the increased polarity of HEAA caused compatibility issues with the mPDMS. However, HEAA has the potential to work with more polar silicones, such as SiMAA, OH-mPDMS, N-(2,3-dihydroxypropane)-N'-(propyl tetra(dimethylsiloxy)dimethylbutylsilane)acrylamide. Thus, a variety of hydroxylalkyl (meth)acrylate compounds can be used to form the hydrogels of the present invention.

TABLE 5

| Component | Example | | | | | |
|---|---|---|---|---|---|---|
| | 17 HPMA | 18 HBMA | 19 DMHEMA | 20 HEAA | 21 GMMA | 22 GMMA |
| NVP (wt %) | 47.5 | 45.18 | 45.18 | 48.75 | 45.01 | 51.63 |
| HOMA Cpd (wt %) | 10.75 | 13.07 | 13.07 | 9.50 | 13.23 | 6.62 |
| HOMA:NVP (molar) | 0.174 | 0.203 | 0.203 | 0.188 | 0.408 | 0.204 |
| % H$_2$O | 58.9 (0.1) | 54.5 | 60.4 | NT* | NT | 62.6 |
| % Haze | 16 (0) | 8 | 15 | NT* | NT* | 12 |
| DCA | 63 (5) | 46 | 70 | NT* | NT* | 49 |
| MOD (psi) | 73.4 (1.4) | 120.5 | 68.7 | NT* | NT* | 70.4 |
| Elong (%) | 230.1 (1.8) | 179.3 | 206.5 | NT* | NT* | 203.5 |
| Dk | 93.4 | 93.4 | 90 | NT* | NT* | 85.3 |
| AC:RM | 84 | 92 | 92 | 92 | 92 | 51 |

NT* = Not Tested

Examples 23-24 & Comparative Examples 3-6

Each reaction mixture was formed by mixing the components listed in Table 6 and degassed by applying vacuum at ambient temperature for about 17(±3) minutes. The reaction mixture (75 μL) was then dosed at room temperature and <0.1% O$_2$, into thermoplastic contact lens molds (FC—Zeonor, BC Polypropylene) which had been degassed in N$_2$ box at RT (Compartment 1, FIG. 1) for a minimum of 12 hours prior to dosing. The BC was placed on the FC mold and the lenses were moved into Compartment 2 and cured for 20 minutes, an intensity of 4-5 mW/cm$^2$, <0.1% O$_2$, and 62-65° C.

The molds were mechanically separated demolded (lenses remained in FC). The lenses were dry released by pressing on the back of the front curve. Lenses were extracted in DI water and equilibrated in borate buffered packing solution in lens vials and sterilized at 122° C. for 30 minutes.

The properties of the lenses were measured and are shown in Table 7, below.

TABLE 6

| | Component | | | | | |
|---|---|---|---|---|---|---|
| | Ex. 23 | 24 | CE3 | CE4 | CE5 | CE6 |
| mPDMS 1000 | 16.50 | 16.50 | 16.50 | 16.50 | 16.50 | 16.50 |

TABLE 6-continued

| | Component | | | | | |
|---|---|---|---|---|---|---|
| | Ex. 23 | 24 | CE3 | CE4 | CE5 | CE6 |
| OH-mPDMS, n = 4 | 27.50 | 27.50 | 27.50 | 27.50 | 27.50 | 27.50 |
| NVP | 46.65 | 44.15 | 41.65 | 39.15 | 35.15 | 23.35 |
| HEMA | 6.75 | 6.75 | 6.75 | 6.75 | 6.75 | 6.75 |
| DMA | 0.00 | 2.50 | 5.00 | 7.50 | 11.50 | 23.30 |
| EGDMA | 0.35 | 0.35 | 0.35 | 0.35 | 0.35 | 0.35 |
| Norbloc | 1.75 | 1.75 | 1.75 | 1.75 | 1.75 | 1.75 |
| CGI 819 | 0.50 | 0.50 | 0.50 | 0.50 | 0.50 | 0.50 |
| Diluent | 10.00 | 10.00 | 10.00 | 10.00 | 10.00 | 10.00 |
| TAA | 100.00 | 100.00 | 100.00 | 100.00 | 100.00 | 100.00 |

TABLE 7

| Ex # | % H$_2$O | % Haze | Mechanicals | | | |
|---|---|---|---|---|---|---|
| | | | DCA | Mod. (psi) | Elong. (%) | Dk | AC:RM |
| Ex 23 | 61 (0) | 6 (1) | 48 (6) | 75 (10) | 145 (57) | 92 | 59 |
| Ex 24 | 63 (0) | 7 (1) | 79 (9) | 57 (6) | 171 (36) | 89 | 84 |
| CE3 | 63 (0) | 9 (1) | 107 (3) | 52 (4) | 164 (53) | 89 | 110 |
| CE4 | 63 (0) | 9 (1) | 110 (4) | 46 (6) | 162 (45) | 89 | 135 |
| CE5 | 60 (0) | 6 (1) | 119 (15) | 53 (6) | 184 (56) | 85 | 175 |
| CE6 | 56 (0) | 4 (0) | 114 (13) | 66 (6) | 195 (44) | 72 | 294 |

DMA is a hydrophilic component with intermediate reaction kinetics. It can be seen from the data in Table 7, that amounts of DMA as small as 2.5 wt % (Example 24), dramatically decrease the modulus, but increase the contact angle of the resulting contact lenses.

Example 25 and Comparative Examples 5-8

Each reaction mixture was formed by mixing the components listed in Table 8 and degassed by applying vacuum at ambient temperature for about 17(±3) minutes. The reaction mixture (75 μt) was then dosed at room temperature and <0.1% O$_2$, into thermoplastic contact lens molds (FC—

Zeonor, BC Polypropylene) which had been degassed in $N_2$ box at RT (Compartment 1, FIG. 1) for a minimum of 12 hours prior to dosing. The BC was placed on the FC mold and the lenses were moved into Compartment 2 and cured for 20 minutes, an intensity of 4-5 mW/cm², <0.1% $O_2$, and 62-65° C.

The molds were mechanically separated demolded (lenses remained in FC). The lenses were dry released by pressing on the back of the front curve. Lenses were extracted in DI water and equilibrated in borate buffered packing solution in lens vials and sterilized at 122° C. for 30 minutes.

TABLE 8

| Component | Ex. 25 | CE5 | CE6 | CE7 |
|---|---|---|---|---|
| SA2 | 50.00 | 50.00 | 50.00 | 50.00 |
| VMA | 40.65 | 30.50 | 20.35 | 10.15 |
| HEMA | 6.75 | 6.75 | 6.75 | 6.75 |
| DMA | 0.00 | 10.15 | 20.30 | 30.50 |
| EGDMA | 0.35 | 0.35 | 0.35 | 0.35 |
| Norbloc | 1.75 | 1.75 | 1.75 | 1.75 |
| CGI 819 | 0.50 | 0.50 | 0.50 | 0.50 |
| Diluent | 10.00 | 10.00 | 10.00 | 10.00 |
| TAA | 100.00 | 100.00 | 100.00 | 100.00 |

TABLE 9

| Ex# | Lens | % $H_2O$ | % Haze | DCA | Mechanicals Mod. (psi) | Mechanicals Elong. (%) | Dk | AC:RM |
|---|---|---|---|---|---|---|---|---|
| 25 | 2766-140A | 58 (1) | 36 (2) | 62 (9) | 299 (32) | 320 (62) | 93 | 59 |
| CE5 | 2766-140B | 65 (1) | 10 (1) | 117 (14) | 42 (6) | 337 (75) | 75 | 162 |
| CE6 | 2766-140C | 58 (0) | 10 (1) | 120 (7) | 44 (4) | 375 (66) | 55 | 264 |
| CE7 | 2766-140D | 48 (0) | 19 (2) | 123 (12) | 95 (9) | 399 (95) | 37 | 367 |

Addition of 10.15 wt % of DMA in the formulation of Comparative Examples 5 dramatically reduced the Dk from 93 to 75, and increased the contact angle from 62 to 177. However, the addition of DMA also lowered the modulus of the resulting lenses dramatically. Amounts of DMA less than about 5 wt % would have a lower AC:RM ratio, and would produce lenses having a better overall balance of properties.

Examples 26 and 27

Reaction mixtures were formed from the components listed in Table 10. Lenses were made using the procedure described in Example 25. The properties of the lenses were measured and are reported in Table 11.

The contact lenses were clinically evaluated in a non-randomized, unmasked, bilateral, single day dispensing study with a lens wear time of 12 (+/−2) hours. The lenses were worn by 10 subjects. Front surface deposition was observed after 60 minutes of contact lens wear and at the follow-up post dispensing visit. Deposits were rated using the following scale:

| Grade 0 | None | No deposition. |
|---|---|---|
| Grade 1 | Slight | Deposition, which occupies 1-5% of the lens surface area. |
| Grade 2 | Mild | Deposition, which occupies 6-15% of the lens surface area. |
| Grade 3 | Moderate | Deposition, which occupies 16-25% of the lens surface area. |
| Grade 4 | Severe | Deposition, which occupies 26% of the lens surface area. |

Strehl ratios (4th order) were measured on a Mach-Zehnder interferometer, using a 5 mm aperture across the optic zone. The values are shown in Table 11, below.

TABLE 10

| Component | Ex. 26 | Ex. 27 |
|---|---|---|
| mPDMS 1000 | 16.50 | 17.45 |
| OH-mPDMS, n = 4 | 27.50 | 29.90 |
| NVP | 46.65 | 43.98 |
| HEMA | 6.73 | 6.00 |
| Blue HEMA | 0.02 | 0.02 |
| EGDMA | 0.45 | 0.00 |
| TEGDMA | 0.00 | 0.20 |
| TAC | 0.00 | 0.20 |
| Norbloc | 1.75 | 1.75 |
| CGI 819 | 0.50 | 0.50 |
| Diluent | 0.00 | 5.00 |
| TAA | 100.00 | 100.00 |

TABLE 11

| | EX. # 26 | EX. # 27 |
|---|---|---|
| % $H_2O$ | 53 (0) | 54 (0) |
| % Haze | NT | NT |
| DCA | 34 (9) | 50 (9) |
| Mod. (psi) | 154 (10) | 106 (8) |
| Elong. (%) | 171 (24) | 296 (34) |
| Dk | 96 | NT |
| SR | 0.9718 (0.0176) | 0.9836 (0.0044) |

SR = Strehl Ratio (4th order)

TABLE 12

| Front Surface Deposition | Post Fit - 60 Mins n (%) | | Follow Up n (%) | |
|---|---|---|---|---|
| | Ex. 26 | Ex. 27 | Ex 26 | Ex. 27 |
| Grade 0 | 17 (85%) | 13 (93%) | 5 (25%) | 1 (7%) |
| Grade 1 | 3 (15%) | 1 (7%) | 7 (35%) | 13 (93%) |
| Grade 2 | 0 | 0 | 8 (40%) | 0 |
| Grade 3 | 0 | 0 | 0 | 0 |
| Grade 4 | 0 | 0 | 0 | 0 |
| Total Eyes | 20 | 14 | 20 | 14 |

Synthetic Example 1

Preparation of VINAL 4.82 g vinyl chloroformate was added to a mixture of 8.19 g β-alanine (Aldrich) in 74 ml acetonitrile. The resulting mixture was refluxed for 2 hours, then cooled to room temperature and allowed to sit for 2 hours. It was filtered and solvent was removed under reduced pressure. The crude product was dissolved in 30 ml distilled water and washed three times with ethyl acetate. The combined ethyl acetate washes were washed with 50 ml deionized water. Solvent was evaporated from the combined ethyl acetate washes to yield 4.5 g product as a fluffy yellowish solid. $^1$H NMR: 7.1 ppm (dd, 1H), 5.4 ppm (br s, OH), 4.7 ppm (dd, 1H), 4.4 ppm (dd, 1H), 3.5 ppm (q, 2H), 2.6 ppm (t, 2H).

Synthetic Example 2

Preparation of 2-hydroxybutyl methacrylate (HBMA)

A blend of 72 grams 1,2-epoxybutane (Aldrich), 0.85 g 4-methoxyphenol (Aldrich), and 6.5 g potassium hydroxide was stirred in a 500 ml round bottomed flask equipped with an addition funnel and thermocouple thermometer. 172 g methacrylic acid was added via the addition funnel, and the blend was slowly to 75° C., and stirred overnight under an air, then increased to 88° C. for 4 hours. The mixture was cooled, and 700 ml of 2.0 N NaOH was added to the mixture in a separatory funnel. The upper layer was washed with borate buffered saline three times. Ethyl ether (200 ml) was added to the combined saline washes to extract any product. The combined organic layers were dried over NaSO$_4$. The NaSO$_4$ was filtered out and the product was distilled (90-98° C./~4 mm Hg). 17.5 g product was collected, to which was added 4 mg 4-methoxyphenol. $^1$H NMR: 6.1 ppm (1H, m), 5.5 (1H, m), 4.8 (0.25H m), 4.2 (0.64H, dd, 8.1 and 11.7 Hz), 4.0 (0.64 Hz, dd, 6.9 and 11.4 Hz), 3.6-3.8 1.26H, m), 2.3 (OH, br s), 1.9 (3 H, m), 1.4-1.7 (2 H, m), 0.9 (3H, m); consistent with a blend of 2-hydroxy-1-propylmethacrylate and 1-hydroxy-2-propylmethacrylate.

Synthetic Example 3

Preparation of dimethylhydroxyethylmethacrylate

The same procedure as for HBMA was used, but substituting 1,2-epoxy-2-methylpropane for the 1,2-epoxypropane. The product was isolated by distillation at 47-48°/0.4-0.6 mm Hg. $^1$H NMR: 6.1 ppm (1H, s), 5.5 (1H, m), 4.0 (2H, s), 2.1 (OH, br s), 1.9 (3 H, s), 1.2 (6 H, m); consistent 2-hydroxy-2-methyl propylmethacrylate (dimethylhydroxyethylmethacrylate).

What is claimed is:

1. A silicone hydrogel comprising a water content of at least about 50% and an oxygen permeability of at least about 80 barrers wherein said silicone hydrogel is formed from a reaction mixture comprising about 37 to about 75 wt % of at least one slow-reacting hydrophilic monomer having a slow-reacting hydrophilic monomer kinetic half life;
   at least one silicone-containing component having a silicone-containing component kinetic half life, which may be optionally substituted with at least one hydroxyl containing group;
   at least one hydroxyl-containing component selected from said silicone-containing components substituted with at least one hydroxyl group, at least one hydroxyalkyl monomer, and mixtures thereof,
   wherein ratio of said slow-reacting hydrophilic component half life to said silicone-containing component half life is at least 2, said reaction mixture comprising between 9 and 14 wt % silicon from all components and less than 15 wt % TRIS and wherein all reactive components other than said slow-reacting hydrophilic monomer and said silicone containing components in the reaction mixture are ancillary components and the hydroxyl containing components are present in an amount sufficient to provide a molar ratio of hydroxyl groups in the reaction mixture to silicon atom content between about 0.16 and about 0.4.

2. The silicone hydrogel of claim 1 wherein said silicone containing components comprise less than 10 wt % TRIS.

3. The silicone hydrogel of claim 1 wherein said silicone containing components are free of TRIS.

4. The silicone hydrogel of claim 1 wherein said ancillary components in said reaction mixture in a concentration of less than 12 wt % based upon reactive components.

5. The silicone hydrogel of claim 1 wherein said water content is at least about 55%.

6. The silicone hydrogel of claim 1 wherein said water content is at least about 60%.

7. The silicone hydrogel of claim 1, 5 or 6 wherein said oxygen permeability is at least about 90 barrers.

8. The silicone hydrogel of claim 1, 5 or 6 wherein said oxygen permeability is at least about 100 barrers.

9. The silicone hydrogel of claim 1 wherein said ancillary components in amounts between about 38 and about 76 mmol/g reactive components.

10. The silicone hydrogel of claim 1, 5 or 6 wherein said oxygen permeability is between about 85 and about 150 barrers.

11. The silicone hydrogel of claim 1, 5 or 6 wherein said oxygen permeability is between about 85 and about 130 barrers.

12. The silicone hydrogel of claim 1, 5 or 6 further comprising a modulus of less than about 150 psi.

13. The silicone hydrogel of claim 1, 5 or 6 further comprising a contact angle of less than about 80°.

14. The silicone hydrogel of claim 1, 5 or 6 further comprising an advancing contact angle of less than about 70°.

15. The silicone hydrogel of claim 1 wherein said at least one slow reacting monomer selected from the group consisting of N-vinylamide monomer of Formula I, vinyl pyrrolidone of Formula II-IV, N-vinyl piperidone of Formula V:

Formula I

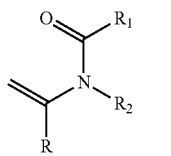

Formula II

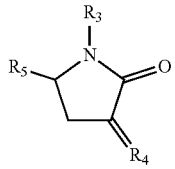

Formula III

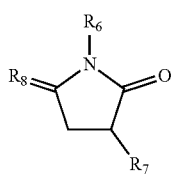

Formula IV

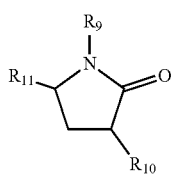

Formula V

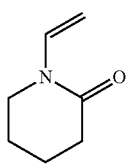

wherein R is H or methyl;

$R_1$, $R_2$, $R_3$, $R_6$, $R_7$, $R_{10}$, and $R_{11}$ are independently selected from the group consisting of H, $CH_3$, $CH_2CH_3$, $CH_2CH_2CH_3$, $C(CH_3)_2$;

$R_4$ and $R_8$ are independently selected from the group consisting of $CH_2$, $CHCH_3$ and $C(CH_3)$;

$R_5$ is selected from H, methyl, ethyl; and $R_9$ is selected from $CH=CH_2$, $C(CH_3)=CH_2$, and $CH=CHCH_3$;

wherein said silicone-containing component is selected from the group consisting of at least one mono (meth) acryloxyalkyl polydialkylsiloxane monomer of Formula VII or the styryl polydialkylsiloxane monomer of Formula VIII:

Formula VII

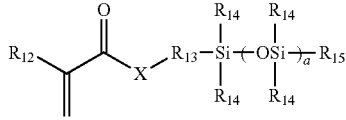

Formula VIII

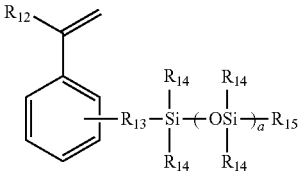

wherein $R_{12}$ is H or methyl;

X is O or $NR_{16}$;

Each $R_{14}$ is independently a $C_1$ to $C_4$ alkyl which may be fluorine substituted, or phenyl;

$R_{15}$ is a $C_1$ to $C_4$ alkyl;

$R_{13}$ is a divalent alkyl group, which may further be functionalized with a group selected from the group consisting of ether groups, hydroxyl groups, carbamate groups and combinations thereof;

a is 3 to 50;

$R_{16}$ is selected from H, C1-4, which may be further substituted with one or more hydroxyl groups; and said hydroxyalkyl monomer is selected from the group consisting of at least one hydroxyalkyl (meth)acrylate or (meth)acrylamide monomer of Formula IX or a styryl compound of Formula X

FORMULA IX

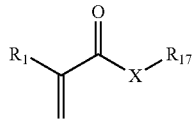

FORMULA X

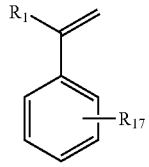

wherein $R_1$ is H or methyl,

X is O or $NR_{16}$, $R_{16}$ is a H, $C_1$ to $C_4$ alkyl, which may be further substituted with at least one OH;

$R_{17}$ is selected from $C_2$-$C_4$ mono or dihydroxy substituted alkyl, and poly(ethylene glycol) having 1-10 repeating units; wherein said at least one hydroxyalkyl (meth) acrylate or (meth)acrylamide monomer and said slow reacting monomer are present in mole percents which form a molar ratio between about 0.15 and 0.4.

16. The silicone hydrogel of claim 1 wherein said at least one slow reacting hydrophilic monomer is selected from the group consisting of N-vinylamide monomer of Formula I, vinyl pyrrolidone of Formula II or IV:

Formula I

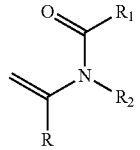

-continued

Formula II

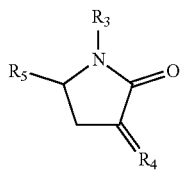

Formula IV

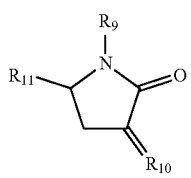

wherein R is H or methyl;

$R_1$, $R_2$, $R_3$, $R_{10}$, and $R_{11}$ are independently selected from the group consisting of H, $CH_3$, $CH_2CH_3$, $CH_2CH_2CH_3$, $C(CH_3)_2$;

$R_4$ is selected from the group consisting of $CH_2$, $CHCH_3$ and $C(CH_3)$;

$R_5$ is selected from H, methyl, ethyl; and $R_9$ is selected from $CH=CH_2$, $C(CH_3)=CH_2$, and $CH=CHCH_3$;

(b) said at least one silicone-containing component is selected from the group consisting of at least one mono(meth)acryloxyalkyl polydialkylsiloxane monomer of Formula VII:

Formula VII

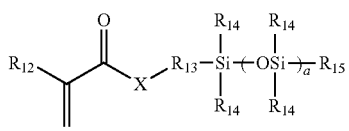

wherein $R_{12}$ is H or methyl;

X is O or $NR_{16}$;

Each $R_{14}$ is independently a $C_1$ to $C_4$ alkyl which may be fluorine substituted, or phenyl;

$R_{15}$ is a $C_1$ to $C_4$ alkyl;

$R_{13}$ is a divalent alkyl group, which may further be functionalized with a group selected from the group consisting of ether groups, hydroxyl groups, carbamate groups and combinations thereof;

a is 3 to 50;

$R_{16}$ is selected from H, $C_{1-4}$, which may be further substituted with one or more hydroxyl groups;

(c) at least one hydroxylalkyl monomer is selected from the group consisting of hydroxyalkyl (meth)acrylate or (meth)acrylamide monomer of Formula IX

FORMULA IX

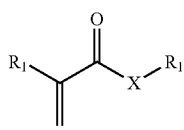

wherein $R_1$ is H or methyl,

X is O or $NR_{16}$, $R_{16}$ is a H, $C_1$ to $C_4$ alkyl, which may be further substituted with at least one OH;

$R_{17}$ is selected from $C_2$-$C_4$ mono or dihydroxy substituted alkyl, and poly(ethylene glycol) having 1-10 repeating units; wherein said at least one hydroxyalkyl (meth)acrylate or (meth)acrylamide monomer and said slow reacting monomer are present in mole percents which form a molar ratio between about 0.15 and 0.4.

17. The silicone hydrogel of claim 15 or 16 wherein each $R_3$ is independently selected from ethyl and methyl groups.

18. The silicone hydrogel of claim 15 or 16 wherein all $R_3$ are methyl.

19. The silicone hydrogel of claim 15 or 16 wherein $R_{13}$ is selected from the group consisting of $C_1$-$C_6$ alkylene group which may be substituted with ether, hydroxyl and combinations thereof.

20. The silicone hydrogel of claim 15 or 16 wherein $R_{13}$ is selected from the group consisting of $C_1$ or $C_3$-$C_6$ alkylene groups which may be substituted with ether, hydroxyl and combinations thereof.

21. The silicone hydrogel of claim 15 or 16 wherein $R_{16}$ is H or methyl.

22. The silicone hydrogel of claim 15 or 16 wherein $R_{12}$ and each $R_{14}$ are methyl.

23. The silicone hydrogel of claim 15 or 16 wherein at least one $R_{14}$ is 3,3,3-trifluoropropyl.

24. The silicone hydrogel of claim 15 or 16 wherein $R_4$ is methyl or 2-hydroxyethyl.

25. The silicone hydrogel of claim 15 wherein a is 5 to 15.

26. The silicone hydrogel of claim 15 or 16 wherein the slow-reacting hydrophilic monomer is selected from the vinyl pyrrolidone of Formula II or IV or the N-vinyl amide monomer of Formula I, having a total number of carbon atoms in $R_1$ and $R_2$ of 4 or less.

27. The silicone hydrogel of claim 15 or 16 wherein the slow-reacting hydrophilic monomer is selected from a vinyl pyrrolidone of Formula III or IV and $R_6$ is methyl, $R_7$ is hydrogen, $R_9$ is $CH=CH_2$, $R_{10}$ and $R_{11}$ are H.

28. The silicone hydrogel of claim 15 or 16 wherein the slow-reacting hydrophilic monomer is selected from ethylene glycol vinyl ether (EGVE), di(ethylene glycol) vinyl ether (DEGVE), N-vinyl pyrrolidone (NVP), 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, N-vinyl-N-methyl acetamide (VMA), N-vinyl-N-ethyl acetamide, N-vinyl-N-ethyl formamide, N-vinyl formamide, N-vinyl acetamide, N-vinyl isopropylamide, allyl alcohol, N-vinyl caprolactam, N-2-hydroxyethyl vinyl carbamate, N-carboxy-β-alanine N-vinyl ester; N-carboxyvinyl-β-alanine (VINAL), N-carboxyvinyl-α-alanine and mixtures thereof.

29. The silicone hydrogel of claim 15 or 16 wherein the slow-reacting hydrophilic monomer is selected from the group consisting of N-vinylpyrrolidone, N-vinylacetamide, 1-methyl-3-methylene-2-pyrrolidone, 1-methyl-5-methylene-2-pyrrolidone, 5-methyl-3-methylene-2-pyrrolidone, and mixtures thereof.

30. The silicone hydrogel of claim 15 or 16 wherein the slow-reacting hydrophilic monomer is selected from the group consisting of NVP, VMA and 1-methyl-5-methylene-2-pyrrolidone.

31. The silicone hydrogel of claim 15 or 16 wherein the slow-reacting hydrophilic monomer comprises NVP.

32. The silicone hydrogel of claim 15 or 16 wherein $R_1$ is H or methyl, X is oxygen and R is selected from $C_2$-$C_4$ mono or dihydroxy substituted alkyl, and poly(ethylene glycol) having 1-10 repeating units.

33. The silicone hydrogel of claim 15 or 16 wherein $R_1$ methyl, X is oxygen and R is selected from $C_2$-$C_4$ mono or dihydroxy substituted alkyl, and poly(ethylene glycol) having 2-20 repeating units.

34. The silicone hydrogel of claim 15 or 16 wherein at least one $R_{14}$ is 3,3,3-trifluoropropyl.

35. The silicone hydrogel of claim 15 or 16 wherein $R_{13}$ is selected from $C_1$-$C_6$ alkylene groups which may be substituted with ether, hydroxyl and combinations thereof.

36. The silicone hydrogel of claim 15 or 16 wherein $R_{13}$ is selected from $C_1$ or $_{C3-6}$ alkylene groups which may be substituted with ether, hydroxyl and combinations thereof.

37. The silicone hydrogel of claim 15 or 16 wherein a is 7 to 30.

38. The silicone hydrogel of claim 15 or 16 wherein $R_{16}$ is H or methyl.

39. The silicone hydrogel of claim 1 wherein said silicone-containing component comprises at least one monomethacryloxyalkylpolydimethylsiloxane methacrylate is selected from the group consisting of monomethacryloxypropyl terminated mono-n-butyl terminated polydimethylsiloxane, monomethacryloxypropyl terminated mono-n-methyl terminated polydimethylsiloxane, monomethacryloxypropyl terminated mono-n-butyl terminated polydiethylsiloxane, monomethacryloxypropyl terminated mono-n-methyl terminated polydiethylsiloxane, N-(2,3-dihydroxypropane)-N'-(propyl tetra(dimethylsiloxy) dimethylbutylsilane)acrylamide; α-(2-hydroxy-1-methacryloxypropyloxypropyl)-ω-butyl-octamethylpentasiloxane and mixtures thereof.

40. The silicone hydrogel of claim 1 wherein said silicone-containing component comprises at least one monomethacryloxyalkylpolydimethylsiloxane methacrylate is selected from the group consisting of monomethacryloxypropyl terminated mono-n-butyl terminated polydimethylsiloxane, monomethacryloxypropyl terminated mono-n-methyl terminated polydimethylsiloxane, N-(2,3-dihydroxypropane)-N'-(propyl tetra(dimethylsiloxy) dimethylbutylsilane)acrylamide.

41. The silicone hydrogel of claim 15 or 16 wherein $R_1$ is H or methyl, X is oxygen and R is selected from $C_2$-$C_4$ mono or dihydroxy substituted alkyl, and poly(ethylene glycol) having 1-10 repeating units.

42. The silicone hydrogel of claim 15 or 16 wherein $R_1$ methyl, X is oxygen and R is selected from $C_2$-$C_4$ mono or dihydroxy substituted alkyl, and poly(ethylene glycol) having 2-20 repeating units.

43. The silicone hydrogel of claim 15 or 16 wherein R is 2-hydroxyethyl, 2,3-dihydroxypropyl, 2-hydroxypropyl.

44. The silicone hydrogel of claim 1 wherein said hydroxyalkyl monomer is selected from the group consisting of 2-hydroxyethyl (meth)acrylate, 3-hydroxypropyl (meth)acrylate, 2-hydroxypropyl (meth)acrylate, 1-hydroxypropyl-2-(meth)acrylate, 2-hydroxy-2-methyl-propyl (meth)acrylate, 3-hydroxy-2,2-dimethyl-propyl (meth)acrylate, 4-hydroxybutyl (meth)acrylate, glycerol (meth)acrylate, 2-hydroxyethyl (meth)acrylamide, polyethyleneglycol monomethacrylate, bis-(2-hydroxyethyl) (meth)acrylamide, 2,3-dihydroxypropyl (meth)acrylamide, and mixtures thereof.

45. The silicone hydrogel of claim 1 wherein said hydroxyalkyl monomer is selected from the group consisting of 2-hydroxyethyl methacrylate, glycerol methacrylate, 2-hydroxypropyl methacrylate, hydroxybutyl methacrylate, 3-hydroxy-2,2-dimethyl-propyl methacrylate, and mixtures thereof.

46. The silicone hydrogel of claim 1 wherein said hydroxyalkyl monomer comprises 2-hydroxyethyl methacrylate, 3-hydroxy-2,2-dimethyl-propyl methacrylate, glycerol methacrylate and mixtures comprising them.

47. The silicone hydrogel of claim 1 further comprising a contact angle of less than about 80°.

48. The silicone hydrogel of claim 1 further comprising a % haze of less than about 50%.

49. The silicone hydrogel of claim 1 further comprising a % haze of less than about 10%.

50. The silicone hydrogel of claim 1 wherein said reaction mixture further comprises at least one slow reacting crosslinker and at least one fast reacting crosslinker.

51. The silicone hydrogel of claim 50 wherein said at least one slow reacting crosslinker and at least one fast reacting crosslinker are each present in said reaction mixture in amounts between about 0.05 to about 0.3 wt %.

52. The silicone hydrogel of claim 50 wherein said at least one slow reacting crosslinker and at least one fast reacting crosslinker are each present in said reaction mixture in amounts between about 0.1 to about 0.2 wt %.

53. The silicone hydrogel of claim 1 wherein said at least one silicone-containing component and said at least one hydroxyl-containing component have the same reactive functionality.

54. The silicone hydrogel of claim 1 wherein the at least one hydroxyalkyl monomer does not contain any silicone and is present in the reactive mixture in an amount sufficient such that the molar ratio of hydroxyl groups in non-silicone containing hydroxyalkyl monomer to silicon atom is between about 0.13 and about 0.35.

\* \* \* \* \*

UNITED STATES PATENT AND TRADEMARK OFFICE
CERTIFICATE OF CORRECTION

PATENT NO. : 9,244,197 B2  Page 1 of 1
APPLICATION NO. : 14/564667
DATED : January 26, 2016
INVENTOR(S) : Alli et al.

It is certified that error appears in the above-identified patent and that said Letters Patent is hereby corrected as shown below:

Claims

Correct Claim 16, Column 37, Formula IV from:

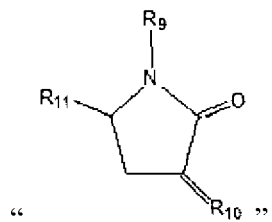

" "

To read:

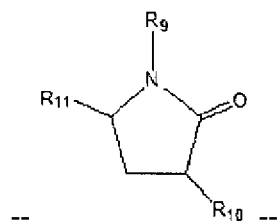

-- --

Correct Claim 36, Column 39, Line 11 from:
"selected from $C_1$ or $_{c3-6}$ alkylene groups which may be sub-"
To read:
-- selected from $C_1$ or $C_{3-6}$ alkylene groups which may be sub- --

Correct Claim 38, Column 39, Line 15 from:
"38. the silicone hydrogel of claim 15 or 16 wherein$R_{16}$ is"
To read:
-- 38. the silicone hydrogel of claim 15 or 16 wherein $R_{16}$ is --

Signed and Sealed this
Twenty-sixth Day of April, 2016

Michelle K. Lee
*Director of the United States Patent and Trademark Office*